(12) United States Patent
Zhou et al.

(10) Patent No.: US 11,012,979 B2
(45) Date of Patent: May 18, 2021

(54) SIGNALING A SUBSET OF CORESETS SELECTED IN COT

(71) Applicant: QUALCOMM Incorporated, San Diego, CA (US)

(72) Inventors: Yan Zhou, San Diego, CA (US); Tao Luo, San Diego, CA (US); Wooseok Nam, San Diego, CA (US); Makesh Pravin John Wilson, San Diego, CA (US); Arumugam Chendamarai Kannan, San Diego, CA (US); Xiaoxia Zhang, San Diego, CA (US); Jing Sun, San Diego, CA (US); Srinivas Yerramalli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 35 days.

(21) Appl. No.: 16/663,003

(22) Filed: Oct. 24, 2019

(65) Prior Publication Data

US 2020/0196277 A1   Jun. 18, 2020

Related U.S. Application Data

(60) Provisional application No. 62/780,163, filed on Dec. 14, 2018.

(51) Int. Cl.
*H04W 72/02* (2009.01)
*H04W 72/04* (2009.01)
(Continued)

(52) U.S. Cl.
CPC ........... *H04W 72/02* (2013.01); *H04W 24/02* (2013.01); *H04W 72/0413* (2013.01)

(58) Field of Classification Search
None
See application file for complete search history.

(56) References Cited

U.S. PATENT DOCUMENTS

| 2018/0279135 | A1 | 9/2018 | Hwang et al. | |
| 2019/0356524 | A1* | 11/2019 | Yi | .......................... H04L 5/0094 |
| 2020/0146058 | A1* | 5/2020 | Xu | ......................... H04L 5/0092 |

FOREIGN PATENT DOCUMENTS

WO   2018106043 A1   6/2018

OTHER PUBLICATIONS

International Search Report and Written Opinion—PCT/US2019/058214—ISA/EPO—dated Feb. 10, 2020.

(Continued)

*Primary Examiner* — Hong S Cho
(74) *Attorney, Agent, or Firm* — Procopio, Cory, Hargreaves & Savitch LLP

(57) ABSTRACT

In order to overcome problems that a UE may face in determining CORESETs and beams for communication with the base station during a COT, a method, apparatus, and computer-readable medium are provided for a base station to indicate to the UE which CORESET(s), QCL relationships, UL resources, and/or spatial relationships are selected for a COT. A UE receives an indication of a set of CORESETs selected from a plurality of CORESETs or a set of QCL relationships selected from a plurality of QCL relationships. The UE determines the set of CORESETs from the plurality of CORESETs or the set of QCL relationships from the plurality of QCL relationships based on the indication received. A UE receives an indication of a set of UL resources or a set of spatial relations. The UE determines the set of UL resources or the set of spatial relations based on the indication received.

30 Claims, 20 Drawing Sheets

(51) Int. Cl.
  *H04L 5/00*    (2006.01)
  *H04B 7/08*    (2006.01)
  *H04W 24/02*   (2009.01)

(56) References Cited

OTHER PUBLICATIONS

Panasonic: "Configuration of DL control resource set and UE bandwidth", 3GPP Draft, 3GPP TSG-RAN WG1 NR AdHoc, R1-1700639, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 16, 2017 (Jan. 16, 2017), pp. 1-5, XP051208164, Retrieved from the Internet: URL: http://www.3gpp.org/ftp/Meetings_3GPP_SYNC/RAN1/Docs/.

Samsung: "On PDCCH Structure", 3GPP Draft, 3GPP TSG RAN WG1 Meeting 90bis, R1-1717641 on PDCCH Structure, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13-2017, Oct. 8, 2017, XP051340827, pp. 1-7, Retrieved from the Internet: URL: http://www.3gpp.org/ftp/Meetings_3GPP_SYNC/RAN1/Docs/ [retrieved on Oct. 8, 2017], Section 2.1.

* cited by examiner

SIGNALING A SUBSET OF CORESETS SELECTED IN COT

CROSS-REFERENCE TO RELATED APPLICATION(S)

This application claims the benefit of U.S. Provisional Application Ser. No. 62/780,163, entitled "SIGNALING A SUBSET OF CORESETS SELECTED IN COT" and filed on Dec. 14, 2018, which is expressly incorporated by reference herein in its entirety.

BACKGROUND

Technical Field

The present disclosure relates generally to communication systems, and more particularly, to wireless communication including control resource sets (CORESETS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with the Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In licensed communication bands, a default user equipment (UE) reception (Rx) beam may be quasi co-located (QCL) with a lowest Control Resource Set Identifier (CORESET ID) in the latest monitored slot. However, communication in unlicensed frequency bands may be different. For example, New Radio Unlicensed (NR-U) focuses on higher, unlicensed frequency bands (e.g. 60 GHz), and data can only be transmitted within a Channel Occupancy Time (COT). The shared nature of the medium may lead to differences in beams used for communication. The base station might use a subset of CORESETs or QCL assumptions in a given COT. For example, a base station might perform or succeed in performing a Clear Channel Assessment (CCA) on certain beams. Thus, the base station might not use CORESET resources associated with other beams. This may lead to problems for the UE in determining CORESETs and beams for communication with the base station during the COT.

Aspects presented herein improve communication between the base station and the UE through the base station indicating to the UE which CORESET(s) or QCL assumptions are selected for a COT. The base station may also indicate uplink (UL) resources or spatial relations for the COT. As used herein, QCL assumptions may also be referred to as a QCL relationship which indicates that the receive and/or transmit signal may share properties with another signal.

In an aspect of the disclosure, a method, a computer-readable medium, and an apparatus are provided. The apparatus may be a UE configured to receive, from a base station, an indication of a set of (CORESETs) selected from a plurality of CORESETS or a set of QCL relationships selected from a plurality of QCL relationships, wherein the indication is for at least one COT. The apparatus determines the set of CORESETS from among the plurality of CORESETs or the set of QCL assumptions from among the plurality of QCL assumptions based on the indication received from the base station.

In an aspect of the disclosure, a method, a computer-readable medium, and an apparatus are provided. In an aspect of the disclosure, a method, a computer-readable medium, and an apparatus are provided. The apparatus may be a base station configured to transmit, to a UE, an indication of a set of CORESETs selected from a plurality of CORESETS or a set of QCL relationships selected from a plurality of QCL relationships, wherein the indication is for at least one COT. The apparatus communicates with the UE using beams based on the set of CORESETs or the set of QCL relationships.

In an aspect of the disclosure, a method, a computer-readable medium, and an apparatus are provided. In an aspect of the disclosure, a method, a computer-readable medium, and an apparatus are provided. The apparatus may be a UE configured to receive, from a base station, an indication of a set of UL resources selected from a plurality of UL resources or a set of spatial relations selected from a plurality of spatial relations, wherein the indication is for at least one COT. The apparatus determines the set of UL resources from among the plurality of UL resources or the set of spatial relations from among the plurality of spatial relations based on the indication received from the base station.

In an aspect of the disclosure, a method, a computer-readable medium, and an apparatus are provided. In an aspect of the disclosure, a method, a computer-readable medium, and an apparatus are provided. The apparatus may be a base station configured to transmit, to a UE, an indication of a set of UL resources selected from a plurality of UL resources or a set of spatial relations selected from a plurality of spatial relations, wherein the indication is for at least one COT. The apparatus transmits communication to the UE using the set of UL resources or the set of spatial relations indicated to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
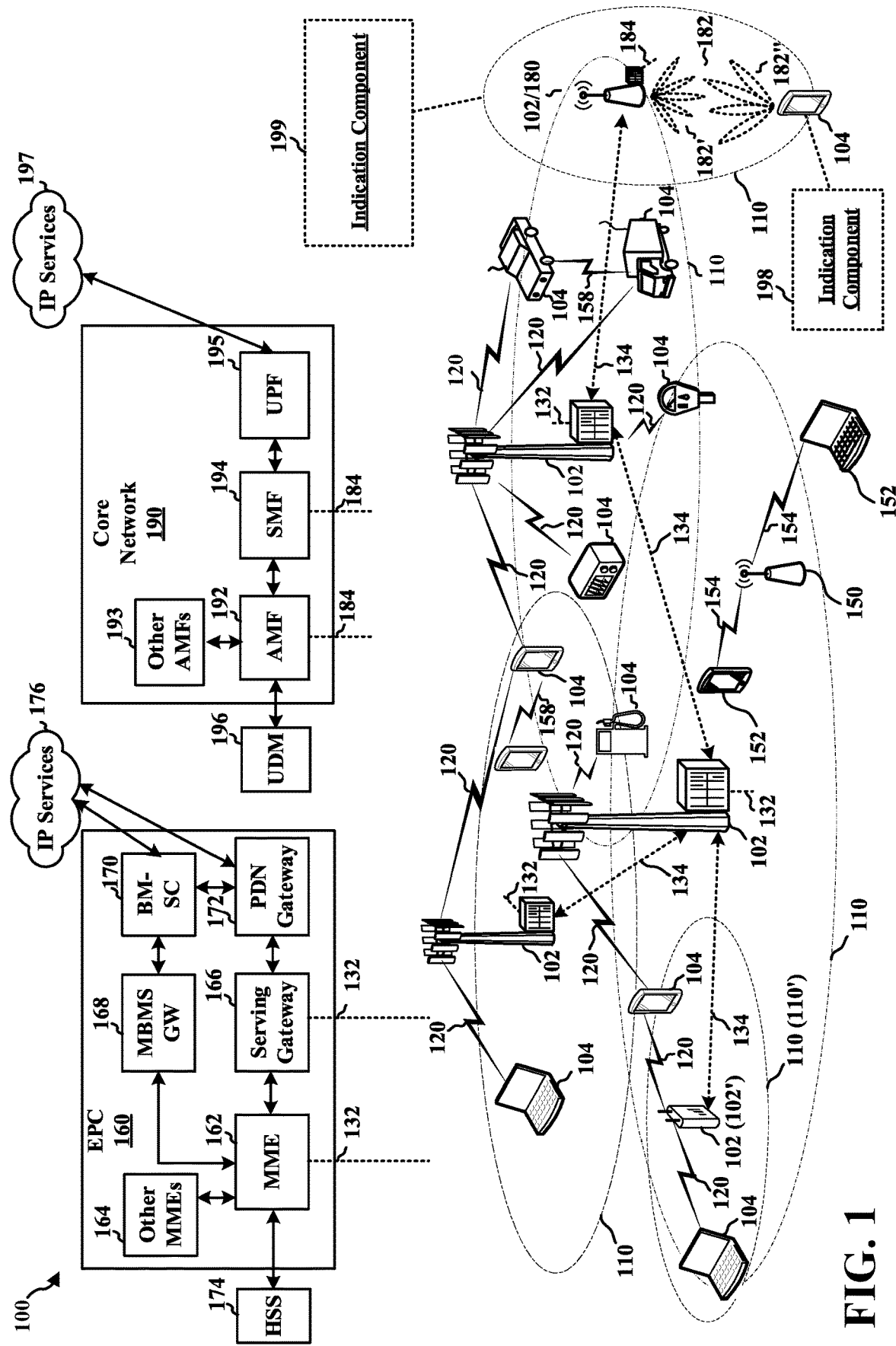
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., an X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell), and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other types of base stations. Some base stations 180, such as a gNB, may operate in a traditional sub 6 GHz spectrum, in millimeter wave (mmW) frequencies, and/or near mmW frequencies in communication with the UE 104. When the gNB (e.g., base station 180) operates in mmW or near mmW frequencies, the base station 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station (e.g., base station 180) may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a streaming service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise an indication component 198 configured to receive, from a base station, an indication of a set of CORESETs selected from a plurality of CORESETs or a set of QCL relationships selected from a plurality of QCL relationships. The UE 104 may be configured to determine the set of CORESETs from among the plurality of CORESETs or the set of QCL relationships from among the plurality of QCL relationships for the at least one COT based on the indication received from the base station.

Referring again to FIG. 1, in certain aspects, the base station 102/180 may comprise an indication component 199 configured to transmit, to a UE, an indication of a set of CORESETs selected from a plurality of CORESETS or a set of QCL relationships selected from a plurality of QCL relationships, wherein the indication is for at least one COT. The base station 102/180 may be configured to communicate with the UE using beams based on the set of CORESETs or the set of QCL assumptions.

In another example, the indication component 199 of base station 102/180 may be configured to transmit, to a UE, an indication of a set of UL resources selected from a plurality of UL resources or a set of spatial relations selected from a plurality of spatial relations, wherein the indication is for at least one COT. The base station 102/180 may be configured to transmit communications to the UE using the set of UL resources or the set of spatial relations indicated to the UE.

In another example, the indication component 198 of UE 104 may be configured to receive, from a base station, an indication of a set of UL resources selected from a plurality of UL resources or a set of spatial relations selected from a plurality of spatial relations, wherein the indication is for at least one COT. The UE 104 may be configured to determine the set of UL resources from among the plurality of UL resources or the set of spatial relations from among the plurality of spatial relations based on the indication received from the base station.

Figure 2A:
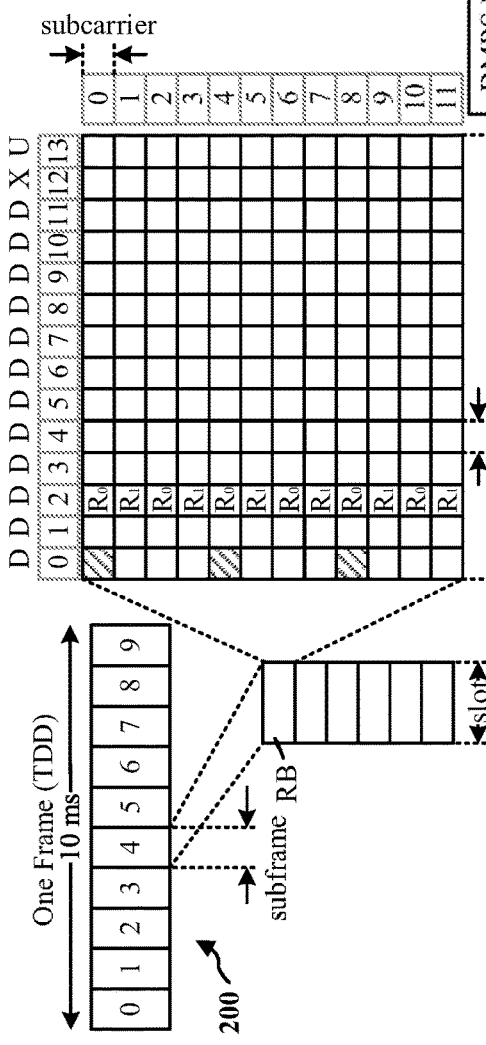
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
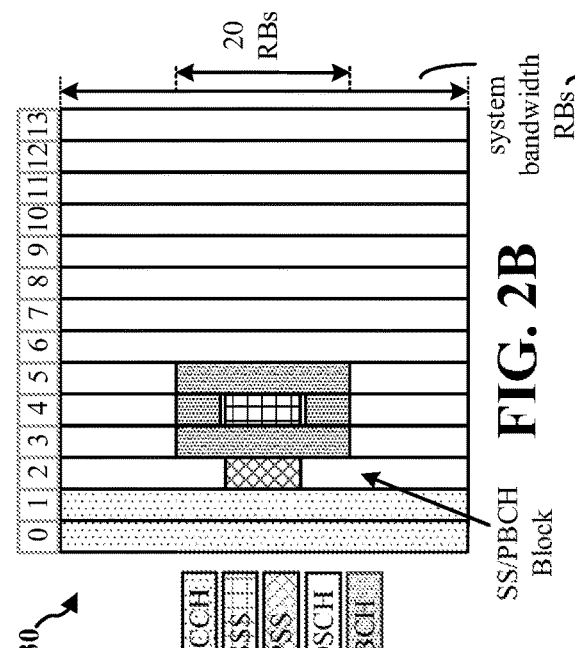
Figure 2C:
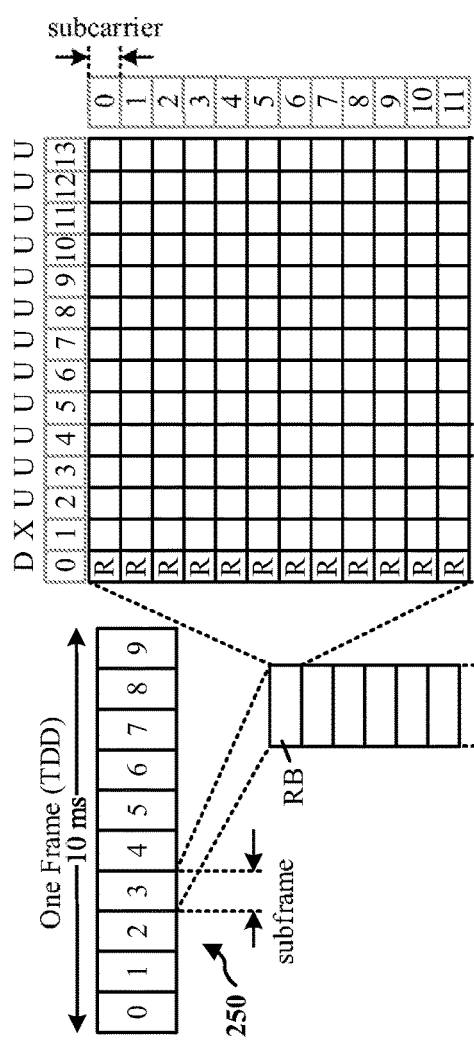
Figure 2D:
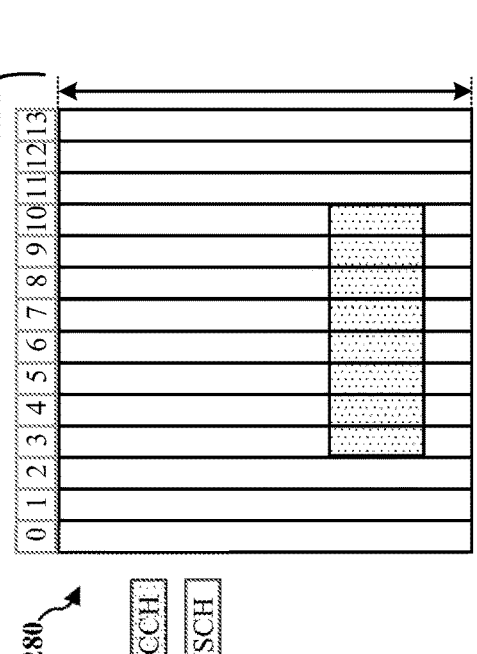

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplex (OFDM) (CP-OFDM) symbols. The symbols on UL may be CP-OFDM symbols (for high throughput scenarios), or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/not-acknowledgement (NACK) feedback. The PUSCH carries data, and may additionally be used to carry a buffer status report (BSR), a power headroom report (PHR), and/or UCI.

Figure 3:
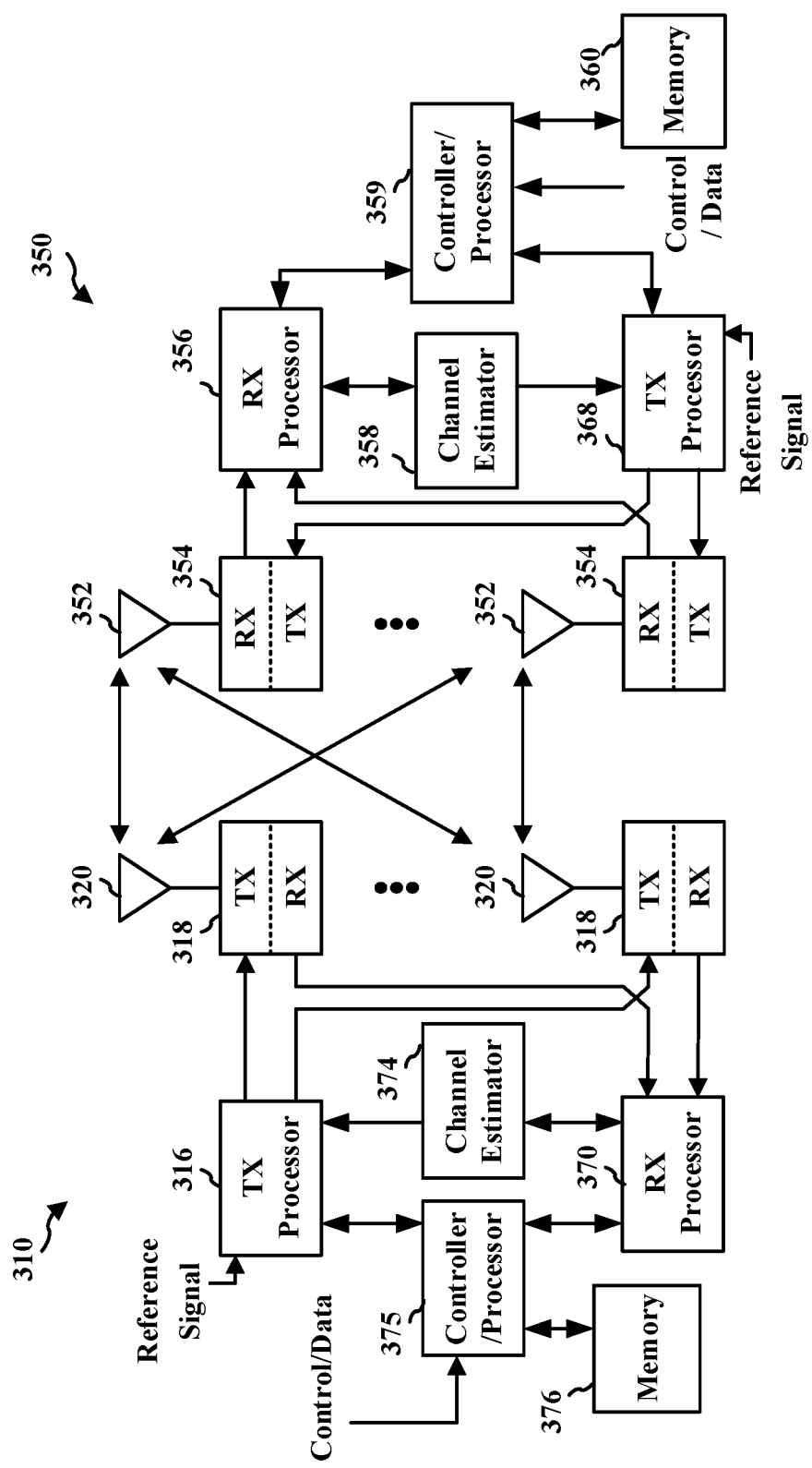
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, an RRC connection release), inter-radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier and the reference signal are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
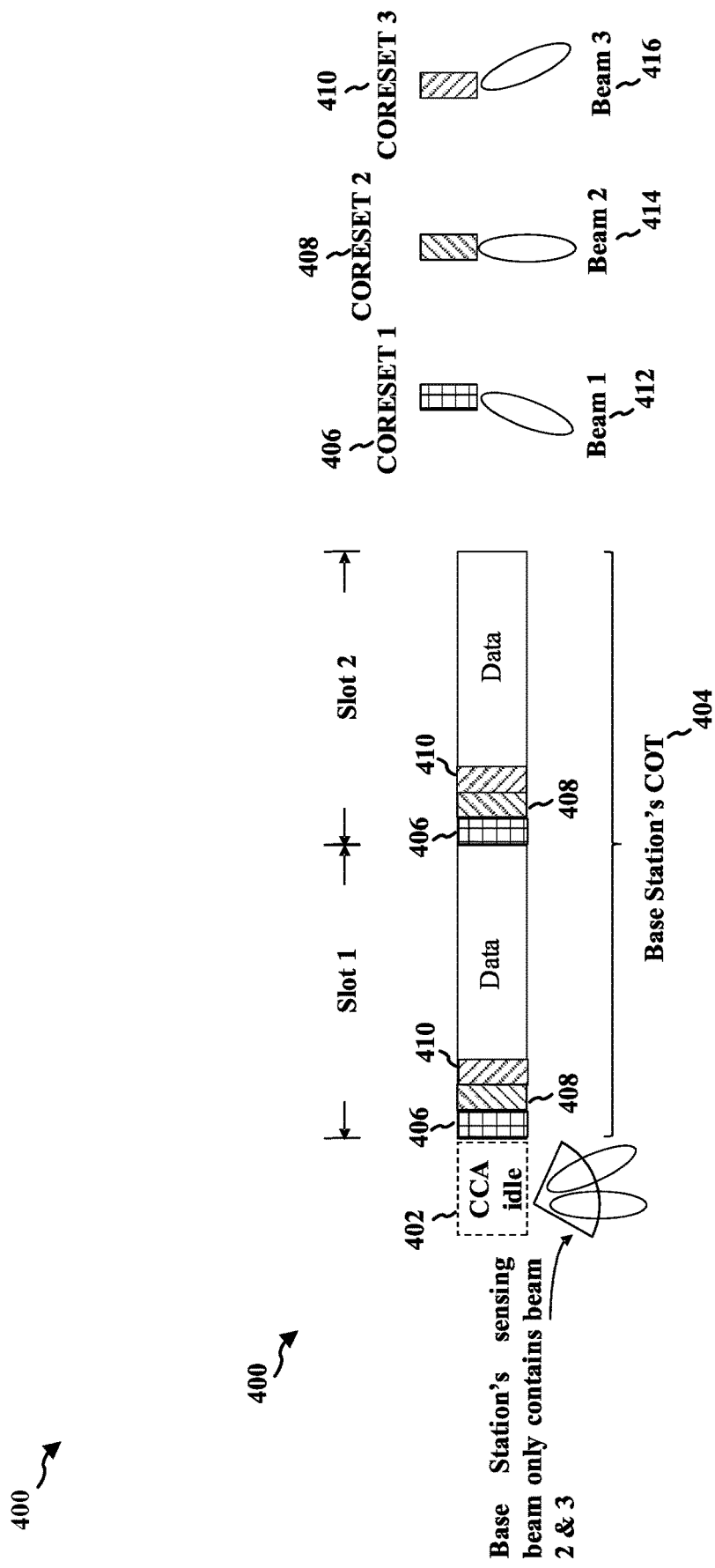
FIG. 4 is a diagram illustrating a CCA idle period followed by a base station's COT.

FIG. 4 is a diagram 400 illustrating an example COT 404 for a base station, e.g., to transmitting and/or receiving communication using an unlicensed frequency band. In unlicensed bands where the transmission medium is generally shared among multiple devices (e.g. 60 GHz), the base station may first perform a CCA, e.g., at 402, to determine if the medium is available for use by the base station. If the CCA clears (i.e. the base station is successful in its contention for the medium), the base station may use the channel for the duration of a COT 404 to schedule grants and transmit/receive data with one or more UEs. A CCA may be an assessment of energy received on a radio interface. A lack of energy on the radio interface for a particular channel may indicate that a channel is clear. A CCA idle period may be a period when a device may be idle on the channel so that channel assessment may occur. The COT may be a period when a base station has secured the channel for a transmission, e.g., a data transmission, or when a base station has secured the channel for transmissions by other devices, e.g., a UE. The base station may inform the UE that it controls the medium by transmitting an initial signal (IS) at the beginning of the COT, discussed infra. While the COT 404 in FIG. 4, is illustrated as spanning two slots, two slots is merely one example of a COT duration to illustrate the concept. The COT 404 may span any number of slots. The IS may provide an indication to the UE informing the UE to monitor for further communication from the base station during the COT.

The base stations's COT 404 is illustrating as including two slots, slot 1 and slot 2. This number is merely an example, and the COT may have a different duration. Each slot may have resources that correspond to control resource sets (CORESET 1, 406; CORESET 2, 408; and CORESET 3, 410). Each CORESET may be associated with a particular beam, e.g., beam 1, beam 2, beam 3. For example, CORESET 1 406 may be transmitted on beam 1 412, CORESET 2 may be transmitted on beam 2 414, and CORESET 3 may be transmitted on beam 3 416. A base station may perform CCA, or pass CCA, for a subset of the beams. The aspect of FIG. 4 illustrates that beam 2 414 and beam 3 416 are used to perform CCA during the CCA idle period 402. Thus, the base station has not checked beam 1 and will not use CORESET 1 that corresponds to beam 1.

In communication in a licensed spectrum, a UE default beam may follow QCL of a lowest CORESET ID in a latest monitored slot. In the example illustrated in FIG. 4, beam 1 412 has not been determined to be clear, and the base station will not use CORESET 1 406. However, the lowest CORESET rule would lead the UE to use beam 1 as the default beam. Thus, selection of the subset of CORESET QCL for transmission in a given COT may lead the UE to determine an incorrect default Rx/Tx beam and may degrade communication between the UE and the base station. Similarly, the UE may rely on a QCL assumption for determining a default Rx/Tx beam that is not consistent with the set of QCL assumptions selected by the base station.

In order to address this problem, a base station may indicate to the UE(s) selected CORESET(s) (e.g., CORESET 2 and CORESET 3 in FIG. 4) or selected CORESET QCLs for a given COT 404. The selection may be based on the beams used by the base station to perform CCA and/or the beams for which CCA was successful. The default beam (e.g., from among beam 1, beam 2, beam 3) may be determined based on the selected subset of CORESETs (CORESET 2, or CORESET 3) or selected CORESET QCLs rather than from the entire set of CORESETs or from the entire set of QCL assumptions. A QCL assumption is a relationship that indicates that the Rx/Tx signal will share properties with another signal. For example, the Rx/Tx beam may have a defined relationship to the beam used for another signal, e.g., a reference signal. Thus, the QCL assumption provides the relationship defining the properties that are shared between the Rx/Tx signal and the other signal. There may be a set of potential QCL assumptions, and the base station may select a subset of the QCL assumptions for use in a particular COT. Aspects described herein may include a base station signaling information about the selected CORESET(s) or the selected CORESET QCL(s). Aspects described herein may also include the UE receives the information about the selected CORESET(s) or the selected CORESET QCL(s) and use the information to select a default reception beam for communication with the base station.

The concept of QCL may be used to improve the channel estimation performance. One channel on one antenna port may be estimated using information about the channel on another antenna port. One antenna port may be considered QCL to another antenna port when they have the same or similar properties. The two antenna ports may have the same or similar properties because they are located near each other in space, oriented the same or similar in space, the antennas used have similar properties, or some combination of these or other aspects of the antennas lead to the antennas having similar properties.

For example, antennas may be considered to be QCL based on one or more of frequency shift, received power for each antenna port, Doppler spread, Doppler shift, delay spread, average gain, an average delay, received timing, a number of significant channel taps, or some combination of these or other figures of merit related to the antenna ports. For QCL antenna ports, one or more of these figures of merit are the same or similar for each of the antenna ports that are considered QCL. One or more of these properties may be determined based on received reference signals or other received signals.

In a first example, the base station may explicitly signal the selected subset of CORESETs or selected subset of QCL assumptions to the UE. Whether the base station uses explicit signaling or implicit signal to indicate the selected CORESET(s)/QCL assumptions, the base station transmits an indication and communicate using beams based on information in the indication. Accordingly, a UE may receive an indication and determine the set based on the indication received. CORESETs or selected CORESET QCLs may be signaled in a given COT. For example, a base station may transmit, to a UE, an indication of a set of CORESETs selected from a plurality of CORESETs or a set of QCL assumptions selected from a plurality of QCL assumptions, wherein the indication is for at least one COT and communicating with the UE using beams based on the set of CORESETs or the set of QCL assumptions. Thus, the UE receives, from the base station, an indication of the set of CORESETs selected from a plurality of CORESETs or a set of QCL assumptions selected from a plurality of QCL assumptions, wherein the indication is for at least one COT and determining the set of CORESETS from among the plurality of CORESETs or the set of QCL assumptions from among the plurality of QCL assumptions based on the indication received from the base station.

A base station may explicitly signal CORESETs or CORESET QCLs in PDCCH, such as in a group common (GC) PDCCH at the beginning of COT. For example, the indication of a set of CORESETs selected from a plurality of CORESETS or a set of QCL assumptions selected from a plurality of QCL assumptions may include signaling identifying the set of CORESETS or the set of QCL assumptions. The indication may be included in a control channel received in the at least one COT.

In another example, the base station may implicitly signal the selected subset of CORESETs or selected subset of QCL assumptions to the UE. For example, the base station may signal such information to the UE in CSI-RS resources with the same QCLs as the selected CORESET(s)/QCL assumptions. The CSI-RS resources may be at the beginning of a COT, so that the UE can determine the beam(s) for use during the COT. CSI-RS resources may be assigned for each of a plurality of CORESETs/QCLs. If a CORESET/QCL assumption is not selected, the base station may refrain from transmitting CSI-RS using corresponding resources.

Figure 5:
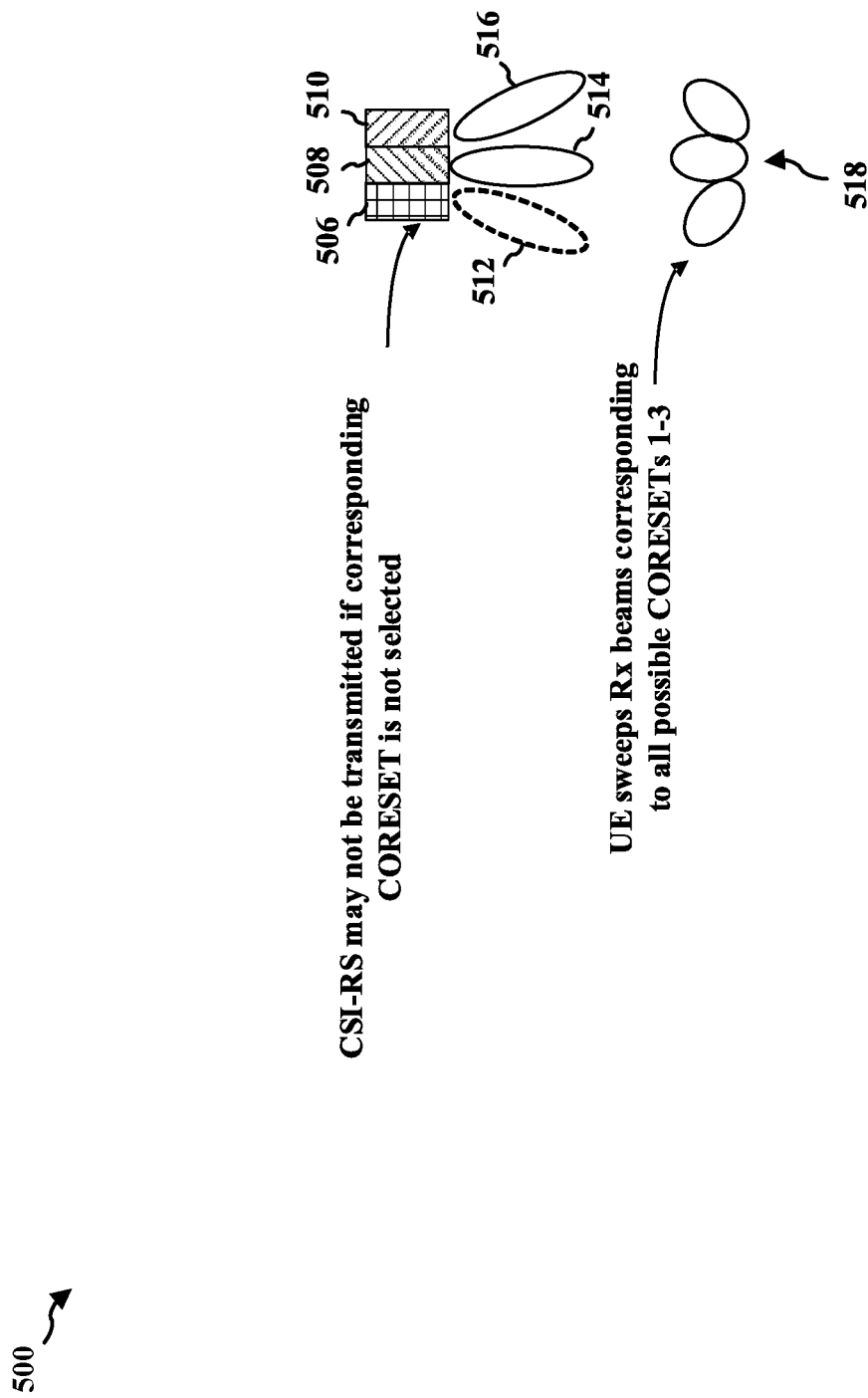
FIG. 5 is a diagram illustrating signaling selected CORESETs or selected CORESET QCLs in a given COT.

FIG. 5 is a diagram 500 illustrating signaling resources for signaling selected CORESETs or selected CORESET QCLs in a given COT. For example, a first resource 506 in time and/or frequency may correspond to a first CORESET, a first QCL, and/or a first beam. A second resource 508 in time and/or frequency may correspond to a second CORESET, a second QCL, and/or a second beam. A third resource 510 in time and/or frequency may correspond to a third CORESET, a third QCL, and/or a third beam. A CSI-RS may not be transmitted by the base station in a particular resource when the corresponding CORESET is not selected. Thus, in the example in FIG. 4, wherein beams 2 and 3 were used for CCA, the base station might refrain from transmitting CSI-RS using the resource 506 associated with beam 1 (e.g., 512). Accordingly, a UE may perform a beam sweep to monitor for CSI-RS during the associated resources in order to determine which CORESET(s)/QCL assumption(s) are selected by the base station for a particular COT. For example, if the UE detected CSI-RS in resources 508 (e.g., beam 514) and 510 (e.g., beam 516) but not 506 (e.g., beam 512), the UE may determine that CORESET 2 and CORESET 3 were selected for the COT.

Thus, a base station may implicitly signal selected CORESETs or selected CORESET QCLs in CSI-RS resources with same QCLs as selected CORESETs and/or QCLs at the beginning of COT. Accordingly, the UE may determine each CORESET in the set of CORESETs or each QCL assumption in the set of QCL assumptions based on detecting a reference signal using a same beam as a corresponding CORESET. Accordingly, the UE determines a CORESET from the plurality of CORESETs to be in the set of CORESETs when a measurement of the reference signal, measured using the same beam as the CORESET, meets a threshold. In an aspect, the UE may determine a QCL assumption from the plurality of QCL assumptions to be in the set of QCL assumptions when the measurement of the reference signal, measured using the same beam as the QCL assumption, meets a threshold. In an aspect, the UE determines a CORESET from the plurality of CORESETs to be in the set of CORESETs when a measurement of the reference signal, measured using the same beam as the CORESET, is highest among the reception beams for the plurality of CORESETs. In an aspect, the UE determines a QCL assumption from the plurality of QCL assumptions to be in the set of QCL assumptions if the measurement of the reference signal, measured using the same beam as the QCL assumption, is highest among the reception beams for the plurality of QCL assumptions.

In the example described in connection with FIG. 5, each CSI-RS resource may correspond to a particular CORESET, a particular beam, and/or a particular QCL assumption. In other aspects, the CSI-RS resources may be repeated with the same QCL as each selected CORESET and/or QCL.

Thus, the indication transmitted by the base station may include a reference signal transmitted using a same beam as a corresponding CORESET or a corresponding QCL assumption. Accordingly, the UE may further be performing a reception beam sweep for the reference signal using reception beams for each of the plurality of CORESETs or for each of the plurality of QCL assumptions.

At the base station, the reference signal may be transmitted using a preconfigured resource in time (e.g., a symbol, RB, slot, or subframe) for the corresponding CORESET or the corresponding QCL assumption. Accordingly, at the UE, the reception beam sweep may be performed for each of the plurality of CORESETs or for each of the plurality of QCL assumptions based on a preconfigured resource in time.

In another example, the CSI-RS resources may be repeated with the same QCL as each selected CORESET and/or QCL. Within each CSI-RS repetition, the UE may sweep across receive beams for all possible CORESETs, e.g., CORESETs 1-3. The UE may determine a CORESET and/or QCL is selected when the CSI-RS is detected by corresponding receive beam, or the CSI-RS RSRP measured by corresponding receive beam exceeds a threshold or is the highest among all swept receive beams.

Figure 6:
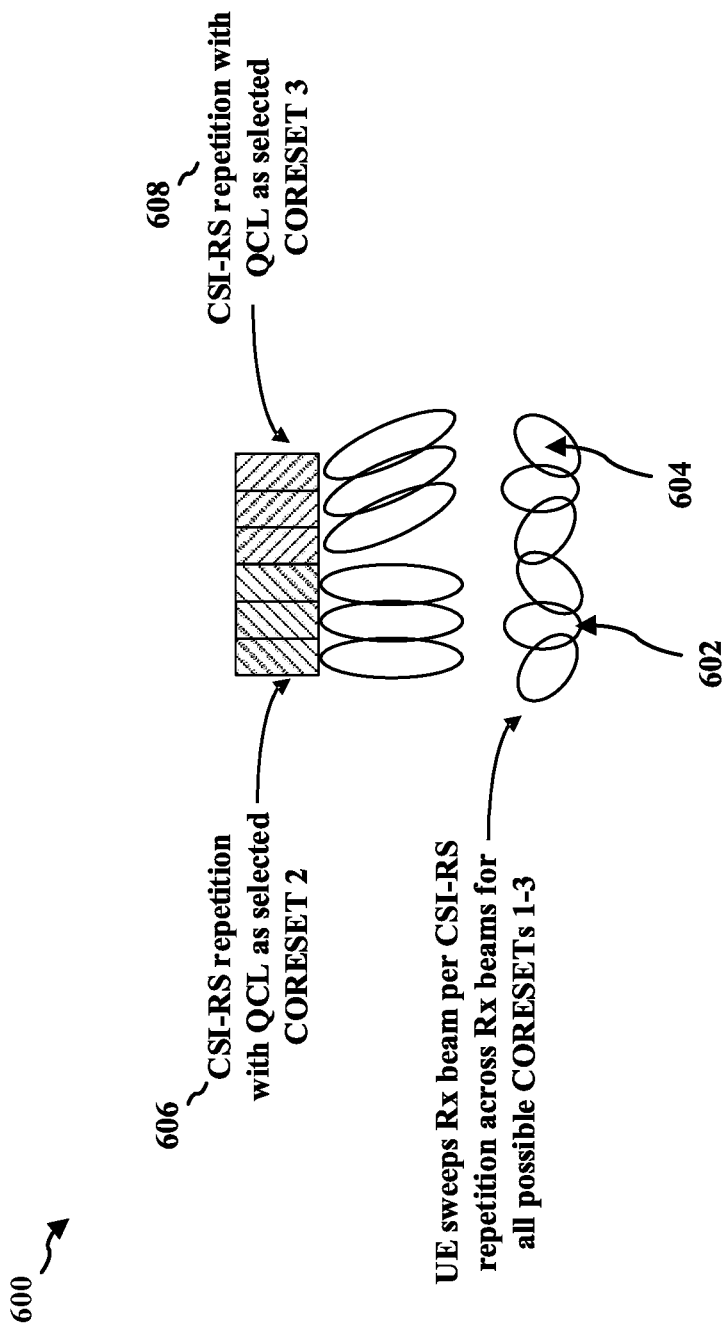
FIG. 6 is a diagram illustrating CSI-RS repetition with QCL.

FIG. 6 is a diagram 600 illustrating CSI-RS repetition with QCL. In the illustrated example of FIG. 6, each CSI-RS is repeated three times. A greater or smaller number of repetitions may be used in some examples, e.g., and may correspond to the number of potential CORESETs/QCL assumptions. In an aspect, the number of repetitions may be equal to the number of potential beams. The number of repetitions may be equal to the number of beams so that a UE sweeping through each beam will receive one time on an active beam. For example, FIG. 6 illustrates a CSI-RS repetition using a same beam with QCL as selected CORESET 2 606. The UE sweeps receive beams 602 per CSI-RS repetition across receive beams for all possible CORESETs 1-3. One beam from the receive beams 602 will result in a received CSI-RS. FIG. 6 also illustrates a CSI-RS repetition with QCL as selected CORESET 3 608. The UE may again sweep receive beams 604 per CSI-RS repetition across receive beams for all possible CORESETs 1-3. One beam from the receive beams 604 will result in a received CSI-RS. Thus, as discussed above, the number of repetitions may be equal to the number of beams so that a UE sweeping through each beam may receive one repetition of a given beam on an active beam.

In FIG. 6, the base station transmits the reference signal repeatedly using a single beam for a corresponding CORESET/QCL assumption. This may enable a UE to perform a beam sweep using a repeating pattern. The repeating pattern may have a reception beam for each of the plurality of CORESETs or for each of the plurality of QCL assumptions. As the UE performs the beam sweep using the different beams, the UE may detect one of the repetitions from the base station using that beam.

The UE may send feedback to the base station to let the base station know that the UE received the indication of the selected CORESET(s)/QCL assumptions. The UE may send a confirmation about the selected CORESETs and/or QCLs. The UEs may confirm reception of indicated selected CORESETs and/or QCLs in different ways. In a first option, a Dedicated NACK/ACK or ACK may be used to provide the feedback. The ACK may be sent when the UE receives signaled information, e.g., on GC-PDCCH or CSI-RS. A NACK or an ACK may be in the form of a PHY sequence., e.g., SRS or PUCCH in the form of a sequence. ACK/NACK resource per UE may be dynamically indicated, e.g., in GC-PDCCH, or may be RRC configured.

In another example, a NACK/ACK or ACK may be included on an UL transmission for UE specific grant. The NACK/ACK or ACK may be sent together with UL transmission scheduled by UE specific grant in COT. The UL transmission may be a scheduled PUSCH or feedback for scheduled PDSCH. The UE may hold the feedback regarding the selected set of CORESET(s)/QCL(s) until the UE has scheduled UL communication.

Thus, the UE may transmit feedback to the base station regarding reception of the indication of the set of CORESETs selected from the plurality of CORESETS or of the set of QCL assumptions selected from the plurality of QCL assumptions. Accordingly, the base station may receive feedback from the UE regarding reception of the indication of the set of CORESETs selected from the plurality of CORESETS or of the set of QCL assumptions selected from the plurality of QCL assumptions.

The feedback may be transmitted using dedicated feedback resources. Accordingly, the feedback may be received using dedicated feedback resources. The UE may transmit an acknowledgment when the UE successfully received the indication of the set of CORESETs selected from the plurality of CORESETs or of the set of QCL assumptions selected from the plurality of QCL assumptions. Accordingly, the base station may receive an acknowledgment when the UE successfully received the indication of the set of CORESETs selected from the plurality of CORESETs or of the set of QCL assumptions selected from the plurality of QCL assumptions.

The dedicated feedback resources may include a physical layer sequence. For example, the physical layer sequence may be transmitted in an SRS or an uplink control channel.

Accordingly, the base station may receive the physical layer sequence in an SRS or an uplink control channel.

The dedicated feedback resources may be UE specific. Accordingly, a base station may transmit a control channel or an RRC indicating the dedicated feedback resources for the UE prior to sending the feedback. The UE may receive a control channel or an RRC indicating the dedicated feedback resources for the UE prior to sending the feedback.

The UE may send the feedback together with a scheduled uplink transmission from the UE. Accordingly, the base station may receive the feedback together with a scheduled uplink transmission from the UE. The UE may hold the feedback until the scheduled uplink transmission. The scheduled uplink transmission may include an uplink transmission scheduled by a UE specific grant in the at least one COT. The scheduled uplink transmission may include additional feedback for a scheduled downlink transmission for the UE. In some aspects, the UE may transmit the feedback in a same COT as the indication. Accordingly, the base station may receive the feedback in a same COT as the indication. In some aspects, the UE may transmit the feedback in a different COT than the indication. Accordingly, the base station receives the feedback in a different COT than the indication.

In addition to signaling and/or confirmation for selected CORESETs and/or QCLs for determining default receive beam, similar mechanisms may be applied for signaling selected UL resources and/or spatial relations that may be used by a UE for determining a default transmit beam or transmit beams. UL resources may include SRS/PUCCH/PUSCH. Spatial relations can include spatial relationships for SRS/PUCCH/PUSCH that relate to signal properties of another signal. A default Tx beam can be used by the UE, at times, to transmit PUCCH/PUSCH/SRS.

Accordingly, a base station may transmit, to a UE, an indication of a set of UL resources selected from a plurality of UL resources or a set of spatial relations selected from a plurality of spatial relations, wherein the indication is for at least one COT and transmitting communication to the UE using the set of UL resources or the set of spatial relations indicated to the UE.

Accordingly, a UE may receive, from a base station, an indication of a set of UL resources selected from a plurality of UL resources or a set of spatial relations selected from a plurality of spatial relations, wherein the indication is for at least one COT and determine the set of UL resources from among the plurality of UL resources or the set of spatial relations from among the plurality of spatial relations based on the indication received from the base station.

In an aspect, the UE may determine a default beam for the at least one COT based on the set of UL resources or the set of spatial relations. In an aspect, the UE may send feedback to the base station regarding the determination of the set of UL resources or the set of spatial relations. Accordingly, the base station may receive feedback from the UE regarding a determination of the set of UL resources or the set of spatial relations. The UE may transmit the feedback using dedicated feedback resources. Accordingly, the base station may receive the feedback using dedicated feedback resources.

In an aspect, the UE transmits an acknowledgment when the UE successfully received the indication of the set of UL resources or the set of spatial relations for use during the at least one COT.

In an aspect, the dedicated feedback resources comprise a physical layer sequence transmitted in an SRS or an uplink control channel. In an aspect, the dedicated feedback resources are UE specific. Furthermore, the UE transmits a control channel or an RRC indicating the dedicated feedback resources for the UE prior to sending the feedback. Accordingly, the base station may receive a control channel or an RRC indicating the dedicated feedback resources for the UE prior to sending the feedback. In an aspect, the feedback may be sent together with a scheduled uplink transmission from the UE. Accordingly, the base station may receive the feedback together with a scheduled uplink transmission from the UE. In an aspect, the UE may hold the feedback until the scheduled uplink transmission. In an aspect, the scheduled uplink transmission may comprise an uplink transmission scheduled by a UE specific grant in the at least one COT. In an aspect, the scheduled uplink transmission may comprise feedback for a scheduled downlink transmission for the UE.

In an aspect, the UE may transmit the feedback in a same COT as the indication. Accordingly, the base station may receive the feedback in a same COT as the indication. In an aspect, the UE may transmit the feedback in a different COT as the indication. Accordingly, the base station may receive the feedback in a different COT as the indication.

Figure 7:
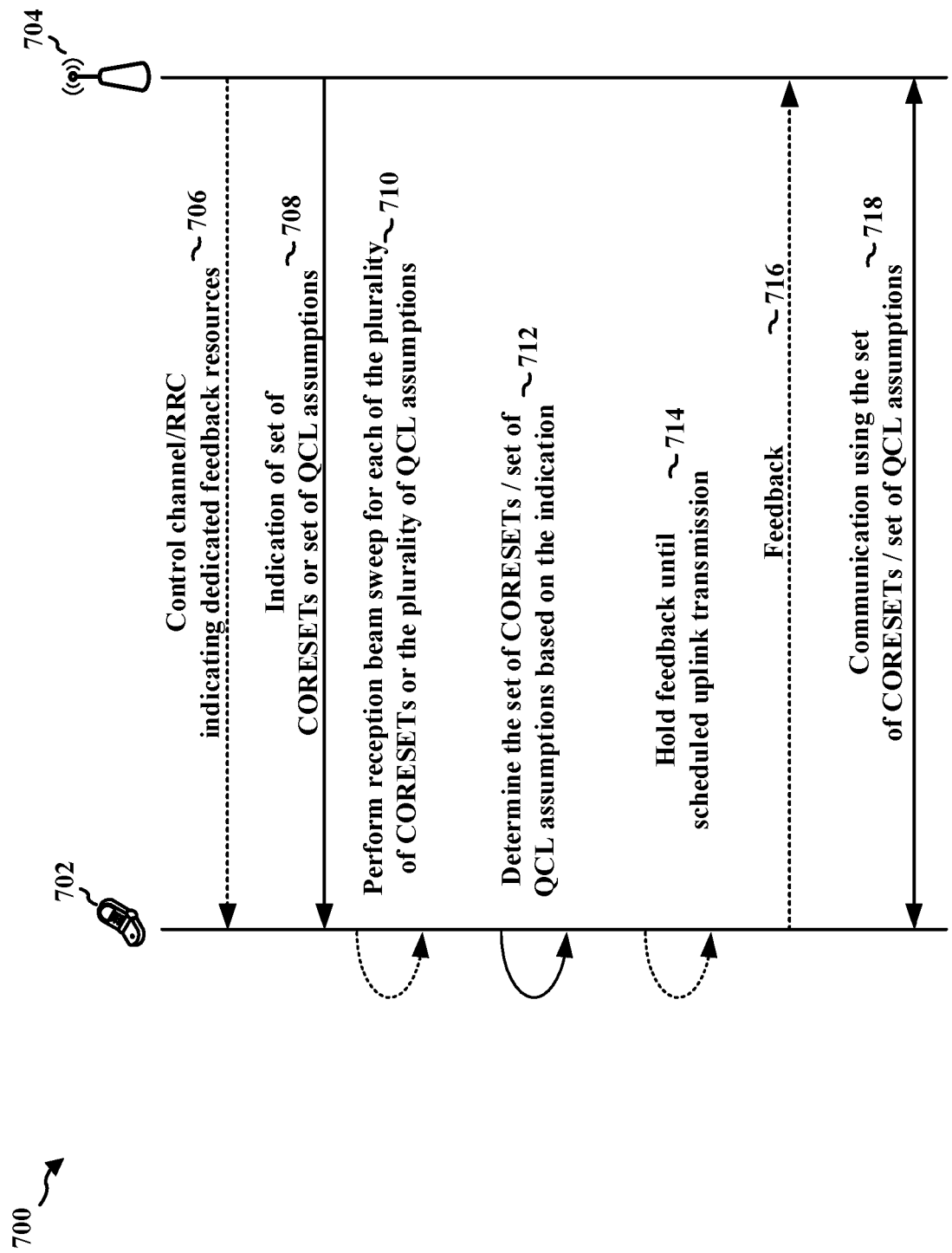
FIG. 7 is an example communication flow between a base station and a UE.

FIG. 7 is an example communication flow diagram 700 between a UE 702 and a base station 704. At 706, the base station 704 may transmit a control channel or an RRC indicating the dedicated feedback resources for the UE 702 prior to sending feedback. Accordingly, the UE 702 may receive the control channel or the RRC indicating the dedicated feedback resources for the UE prior to sending the feedback.

At 708, the base station 704 transmits, to the UE 702, an indication of a set of CORESETs selected from a plurality of CORESETS or a set of QCL assumptions selected from a plurality of QCL assumptions. Accordingly, the UE may receive, from the base station 704, the indication of a set of CORESETs selected from the plurality of CORESETS or the set of QCL assumptions selected from a plurality of QCL assumptions, wherein the indication is for at least one COT.

The indication may be for at least one COT. In an example, the indication may comprise signaling identifying the set of CORESETS or the set of QCL assumptions. The indication may be comprised in a control channel transmitted in the at least one COT. The indication may comprise a reference signal transmitted using a same beam as a corresponding CORESET or a corresponding QCL assumption. The reference signal may be transmitted using a preconfigured resource in time for the corresponding CORESET or the corresponding QCL assumption. The reference signal may be transmitted repeatedly using a first beam for a first CORESET from the set of CORESETs or for a first QCL assumption from the set of QCL assumptions.

In another example, the UE 702 may determine each CORESET in the set of CORESETs or each QCL assumption in the set of QCL assumptions based on detecting a reference signal using a same beam as a corresponding CORESET.

The UE 702 may determine a CORESET from the plurality of CORESETs to be in the set of CORESETs if a measurement of the reference signal, measured using the same beam as the CORESET, meets a threshold. The UE may determine a QCL assumption from the plurality of QCL assumptions to be in the set of QCL assumptions if the measurement of the reference signal, measured using the same beam as the QCL assumption, meets a threshold.

The UE 702 may determine a CORESET from the plurality of CORESETs to be in the set of CORESETs if a measurement of the reference signal, measured using the same beam as the CORESET, is highest among the reception beams for the plurality of CORESETs. The UE may determine a QCL assumption from the plurality of QCL assumptions to be in the set of QCL assumptions if the measurement of the reference signal, measured using the same beam as the QCL assumption, is highest among the reception beams for the plurality of QCL assumptions.

At 710, the UE 702 may perform a reception beam sweep for the reference signal using reception beams for each of the plurality of CORESETs or for each of the plurality of QCL assumptions. The reception beam sweep may be performed for each of the plurality of CORESETs or for each of the plurality of QCL assumptions based on a preconfigured resource in time. The reception beam sweep may be performed using a repeating pattern, the repeating pattern having a reception beam for each of the plurality of CORESETs or for each of the plurality of QCL assumptions.

At 712, the UE 702 determines the set of CORESETS from among the plurality of CORESETs or the set of QCL assumptions from among the plurality of QCL assumptions based on the indication received from the base station.

At 716, the UE 702 may transmit feedback to the base station regarding reception of the indication of the set of CORESETs selected from the plurality of CORESETS or of the set of QCL assumptions selected from the plurality of QCL assumptions. The feedback may be transmitted in a same COT as the indication. The feedback may be transmitted in a different COT than the indication. The feedback may be transmitted using dedicated feedback resources. The UE 702 may transmit an acknowledgment if the UE 702 successfully received the indication of the set of CORESETs selected from the plurality of CORESETs or of the set of QCL assumptions selected from the plurality of QCL assumptions. In another example, the dedicated feedback resources comprise a physical layer sequence. The physical layer sequence may be transmitted in a SRS or an uplink control channel.

In another example, the feedback may be sent together with a scheduled uplink transmission from the UE 702. Thus, at 714, the UE 702 may hold the feedback until the scheduled uplink transmission. The scheduled uplink transmission may comprise an uplink transmission scheduled by a UE 702 specific grant in the at least one COT. The scheduled uplink transmission may comprise additional feedback for a scheduled downlink transmission for the UE 702.

At 716, the base station 704 may receive feedback from the UE 702 regarding reception of the indication of the set of CORESETs selected from the plurality of CORESETS or of the set of QCL assumptions selected from the plurality of QCL assumptions. The feedback may be received using dedicated feedback resources. For example, the base station may receive an acknowledgment if the UE 702 successfully received the indication of the set of CORESETs selected from the plurality of CORESETs or of the set of QCL assumptions selected from the plurality of QCL assumptions. The dedicated feedback resources may comprise a physical layer sequence. The physical layer sequence may be received in an SRS or an uplink control channel.

The feedback may be received together with a scheduled uplink transmission from the UE 702. The scheduled uplink transmission may comprise an uplink transmission scheduled by a UE 702 specific grant in the at least one COT. The scheduled uplink transmission may comprise feedback for a scheduled downlink transmission for the UE 702. The feedback may be received in a same COT as the indication. The feedback may be received in a different COT than the indication.

At 718, the base station 704 communicates with the UE 702 using beams based on the set of CORESETs or the set of QCL assumptions. For example, the base station 704 may transmit a communication to the UE 702 using beams based on the indication. The base station 704 may receive communication from the UE using beams based on the indication. The UE 702 may also communicate with the base station 704 using beams based on the set of CORESETs or the set of QCL assumptions.

Figure 8:
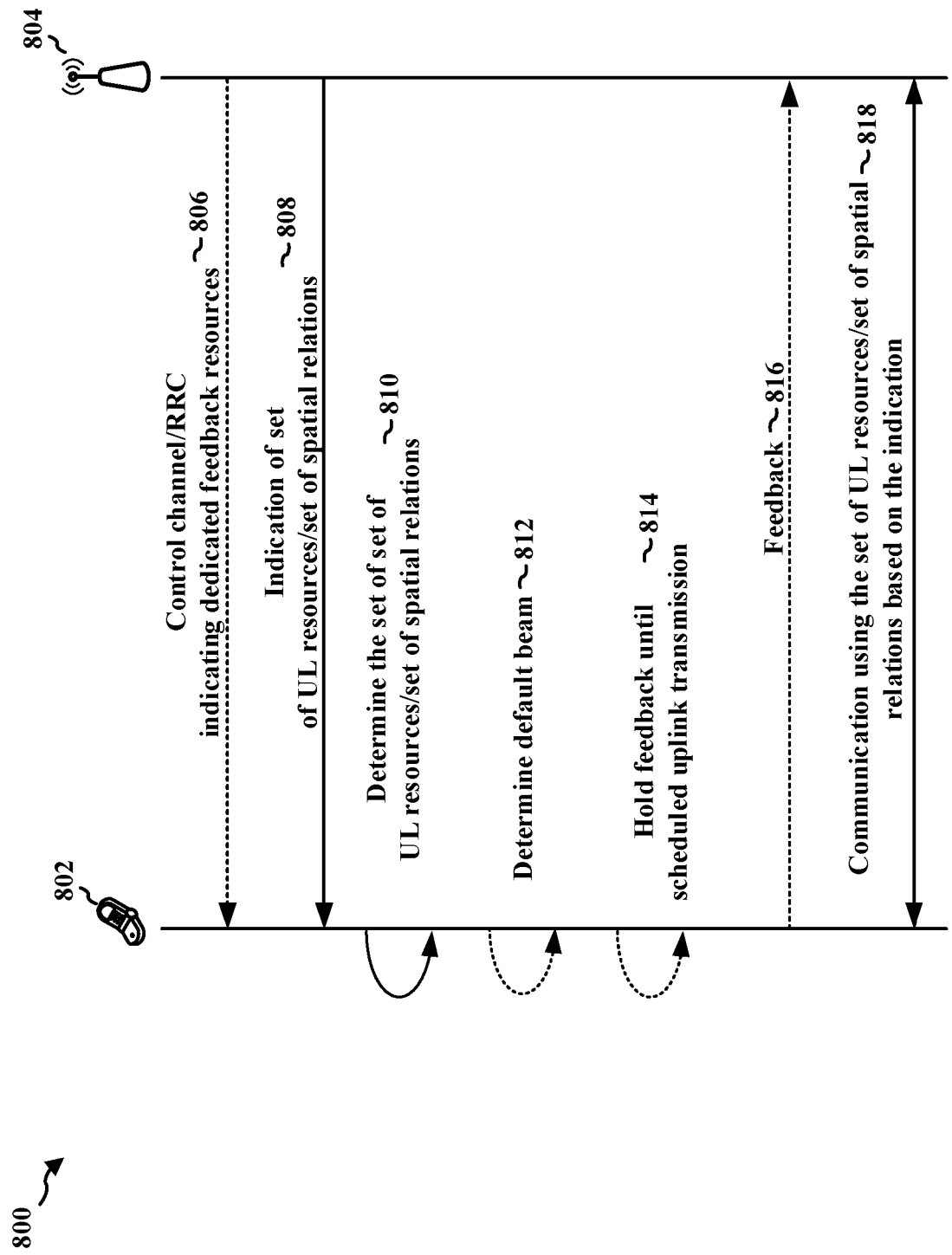
FIG. 8 is an example communication flow between a base station and a UE.

FIG. 8 is a signal flow diagram 800 illustrating interactions between a UE 802 and a base station 804. At 806, the base station 804 may transmit control channel and/or RRC indicating dedicated feedback resources to the UE 802. Accordingly, the UE 802 may receive control channel and/or RRC indicating dedicated feedback resources.

At 808, the base station 804 may transmit an indication of a set of UL resources and/or set of spatial relations. Accordingly, the UE 802 may receive an indication of a set of UL resources and/or set of spatial relations. The indication may be for at least one COT.

At 810, the UE 802 may determine the set of UL resources from among the plurality of UL resources or the set of spatial relations from among the plurality of spatial relations based on the indication received from the base station 804. The indication may include explicit signaling from the base station. In other examples, the UE may determine the information.

At 812, the UE 802 may determine a default beam for the at least one COT based on the set of UL resources or the set of spatial relations.

At 814, the UE 802 may hold the feedback until a scheduled uplink transmission. The scheduled uplink transmission may comprise an uplink transmission scheduled by a UE 802 specific grant in the at least one COT. The scheduled uplink transmission may comprise feedback for a scheduled downlink transmission for the UE 802. The feedback may be transmitted in a same COT as the indication. The feedback may be transmitted in a different COT than the indication.

At 816, the UE 802 may transmit feedback to the base station 804 regarding the determination of the set of UL resources or the set of spatial relations. Accordingly, the base station 804 may receive feedback.

The feedback may be transmitted using dedicated feedback resources. The UE 802 may transmit an acknowledgment if the UE 802 successfully received the indication of the set of UL resources or the set of spatial relations for use during the at least one COT. The dedicated feedback resources may comprise a physical layer sequence transmitted in an SRS or an uplink control channel. The dedicated feedback resources may be UE 802 specific. Thus, at 806, the UE 802 may receive a control channel or an RRC indicating the dedicated feedback resources for the UE prior to sending the feedback. Then, the UE 802 may transmit the feedback at 816 using the indicated resources as discussed above. The feedback may be sent together with a scheduled uplink transmission from the UE 802.

The feedback may be received using dedicated feedback resources. In an example, the dedicated feedback resources may include a physical layer sequence transmitted in an SRS or an uplink control channel. In another example, the dedicated feedback resources may be UE specific. The feedback may be received together with a scheduled uplink transmission from the UE. In an example, the scheduled uplink transmission may include an uplink transmission scheduled by a UE specific grant in the at least one COT. In another example, the scheduled uplink transmission may include feedback for a scheduled downlink transmission for the UE. In an aspect, the feedback may be received in a same COT as the indication. In another aspect, the feedback may be received in a different COT than the indication.

At 818, the base station 804 communicates with the UE based on the set of UL resources and/or the set of spatial relations based on the indication. The UE 802 may communicate with the base station 804 based on the set of UL resources and/or the set of spatial relations based on the indication.

Figure 9:
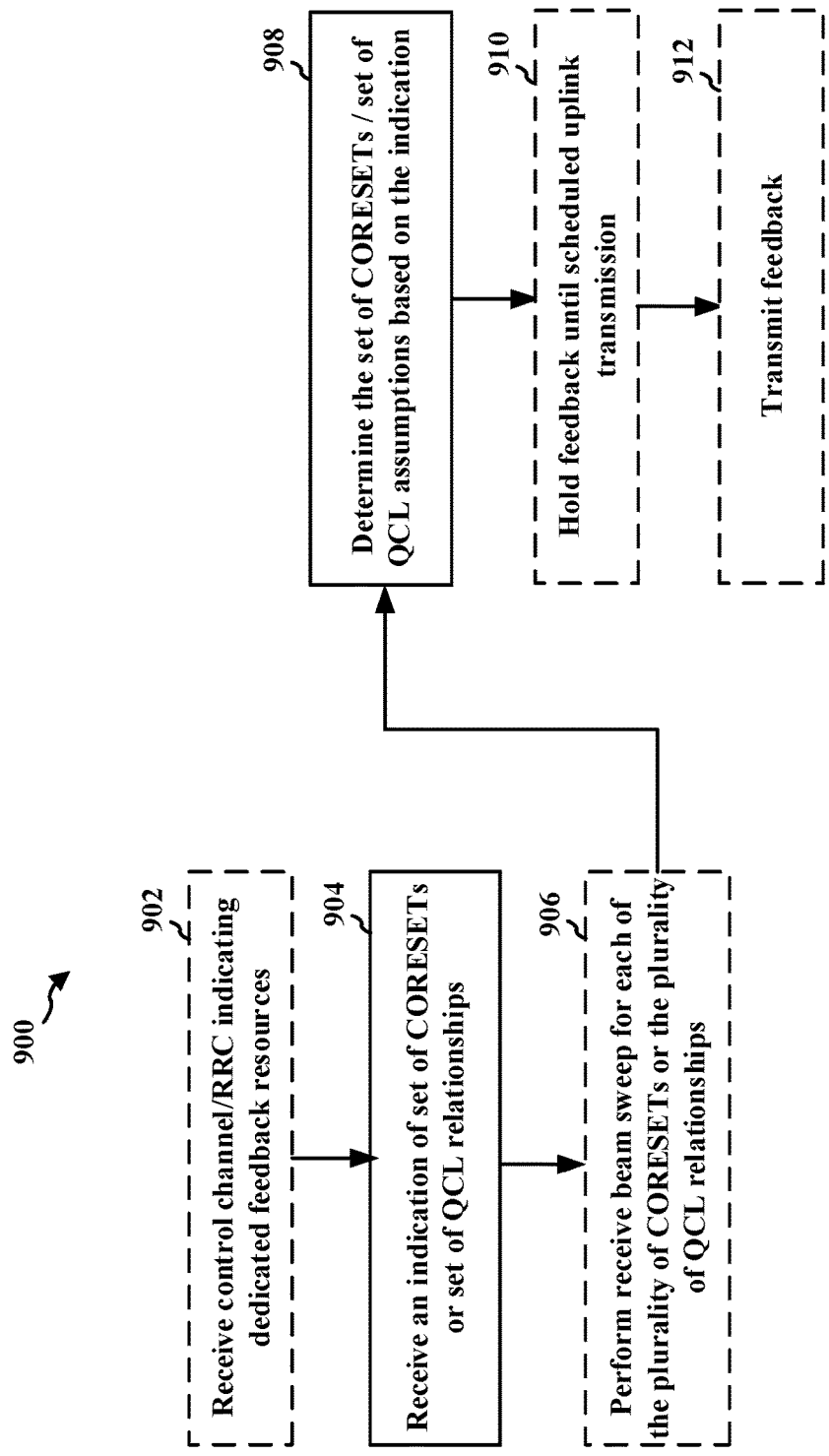
FIG. 9 is a flowchart of a method of wireless communication.

FIG. 9 is a flowchart 900 of a method of wireless communication. The method may be performed by a UE or a component of a UE (e.g., UE 102, 350, 702, 802, 1350, 1950; the apparatus 1002/1002'; the processing system 1114, which may include the memory 360 and which may be the entire UE 350 or a component of the UE 350, such as the TX processor 368, the RX processor 356, and/or the controller/processor 359). According to various aspects, one or more of the illustrated operations of the method 900 may be omitted, transposed, and/or contemporaneously performed. The UE may implement the method of diagram 700. The method may enable a UE to more accurately determine a default beam when communicating with a base station using beamforming over an unlicensed spectrum.

At 904, the UE receives an indication of a set of CORESETs selected from a plurality of CORESETS or a set of QCL assumptions selected from a plurality of QCL assumptions. For example, 904 may be performed by indication component 1008 of apparatus 1002. The UE may receive the indication from a base station. In some aspects, the indication may be for at least one COT. In some aspects, the indication may comprise signaling configured to identify the set of CORESETS. In some aspects, the indication may be comprised in a control channel received in the at least one COT.

In some aspects, for example at 906, the UE may perform a reception beam sweep. For example, 906 may be performed by beam sweep component 1012 of apparatus 1002. The UE may perform the reception beam sweep for a reference signal using reception beams for each of the plurality of CORESETs or for each of the plurality of QCL assumptions. The UE may determine each CORESET in the set of CORESETs or each QCL assumption in the set of QCL assumptions based on detecting the reference signal using a same beam as a corresponding CORESET. For example, the UE may perform a reception beam sweep for the reference signal using reception beams for each of the plurality of CORESETs or for each of the plurality of QCL assumptions. The reception beam sweep may be performed for each of the plurality of CORESETs or for each of the plurality of QCL assumptions based on a preconfigured resource in time, e.g., such as described in connection with FIG. 5. The reception beam sweep may be performed using a repeating pattern, the repeating pattern having a reception beam for each of the plurality of CORESETs or for each of the plurality of QCL assumptions, e.g., as described in connection with FIG. 5.

The UE may determine a CORESET from the plurality of CORESETs to be in the set of CORESETs if a measurement of the reference signal, measured using the same beam as the CORESET, meets a threshold. The UE may determine a QCL assumption from the plurality of QCL assumptions to be in the set of QCL assumptions if the measurement of the reference signal, measured using the same beam as the QCL assumption, meets a threshold.

The UE may determine a CORESET from the plurality of CORESETs to be in the set of CORESETs if a measurement of the reference signal, measured using the same beam as the CORESET, is highest among the reception beams for the plurality of CORESETs. The UE may determine a QCL assumption from the plurality of QCL assumptions to be in the set of QCL assumptions if the measurement of the reference signal, measured using the same beam as the QCL assumption, is highest among the reception beams for the plurality of QCL assumptions.

At 908, the UE determines the set of CORESETs from among the plurality of CORESETs or the set of QCL assumptions from among the plurality of QCL assumptions. For example, 908 may be performed by determination component 1010 of apparatus 1002. The UE may determine the set of CORESETs or the set of QCL assumptions based on the indication received from the base station.

In some aspects, for example at 912, the UE may transmit feedback to the base station regarding reception of the indication of the set of CORESETs selected from the plurality of CORESETS or of the set of QCL assumptions selected from the plurality of QCL assumptions. For example, 912 may be performed by feedback component 1014 of apparatus 1002. The feedback may be transmitted in a same COT as the indication. The feedback may be transmitted in a different COT than the indication. The feedback may be transmitted using dedicated feedback resources. The UE may transmit an acknowledgment if the UE successfully received the indication of the set of CORESETs selected from the plurality of CORESETs or of the set of QCL assumptions selected from the plurality of QCL assumptions. In another example, the dedicated feedback resources comprise a physical layer sequence. The physical layer sequence may be transmitted in a Sounding Reference Signal (SRS) or an uplink control channel.

The dedicated feedback resources may be UE specific. Thus, in some aspects, the UE, at 902, may receive a control channel or an RRC indicating the dedicated feedback resources for the UE prior to sending the feedback. For example, 902 may be performed by resource component 1016 of apparatus 1002.

In another example, the feedback may be sent together with a scheduled uplink transmission from the UE. Thus, at 910, the UE may hold the feedback until the scheduled uplink transmission. For example, 910 may be performed by feedback component 1014 of apparatus 1002. The scheduled uplink transmission may comprise an uplink transmission scheduled by a UE specific grant in the at least one COT. The scheduled uplink transmission may comprise additional feedback for a scheduled downlink transmission for the UE.

Figure 10:
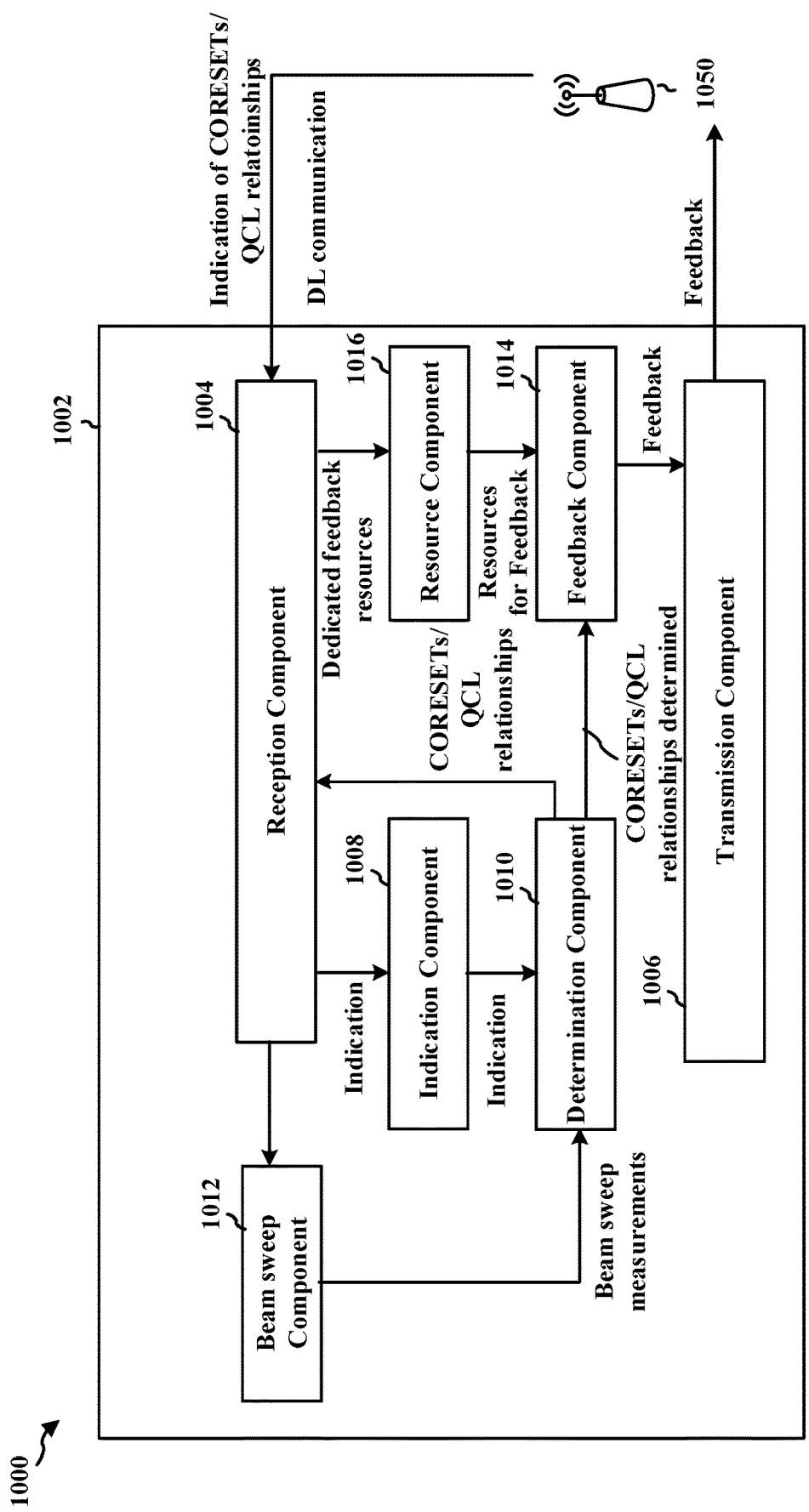
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus may perform the method of flowchart 900. The apparatus includes a reception component 1004 that receives downlink communication from base station 1050, and a transmission component 1006 that transmits uplink communication to base station 1050. The apparatus includes an indication component 1008 configured to receive, from a base station, an indication of a set of CORESETs selected from a plurality of CORESETS or a set of QCL assumptions selected from a plurality of QCL assumptions, wherein the indication is for at least one COT, e.g., as described in connection with 904 of FIG. 9. The apparatus includes a determination component 1010 configured to determine the set of CORESETS from among the plurality of CORESETs or the set of QCL assumptions from among the plurality of QCL assumptions based on the indication received from the base station, e.g., as described in connection with 908 of FIG. 9. The apparatus includes a beam sweep component 1012 configured to perform a reception beam sweep for the reference signal using reception beams for each of the plurality of CORESETs or for each of the plurality of QCL assumptions, e.g., as described in connection with 906 of FIG. 9. The apparatus includes a feedback component 1014 configured to transmit feedback to the base station regarding reception of the indication of the set of CORESETs selected from the plurality of CORESETs or of the set of QCL assumptions selected from the plurality of QCL assumptions, e.g., as described in connection with 912 of FIG. 9. The apparatus includes a resource component 1016 configured receive a control channel or a Radio Resource Configuration (RRC) indicating the dedicated feedback resources for the UE prior to sending the feedback, e.g., as described in connection with 902 of FIG. 9. The feedback component 1014 may be configured to hold the feedback until the scheduled uplink transmission, e.g., as described in connection with 910.

The apparatus may include additional components that perform each of the blocks of the algorithm in the aforementioned flowchart of FIG. 9 As such, each block in the aforementioned flowchart of FIG. 9 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
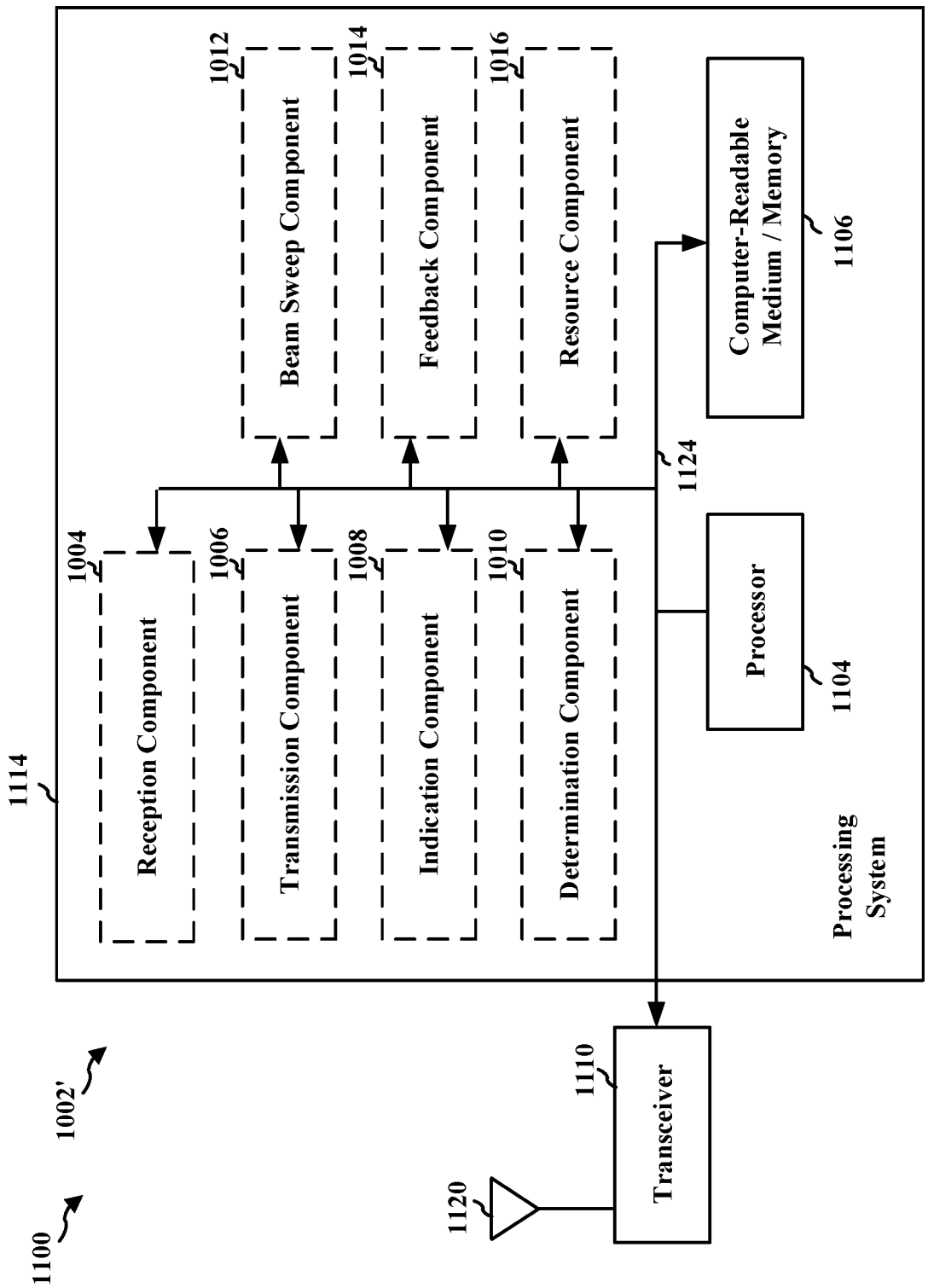
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer-readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving, from a base station, an indication of a set of CORESETs selected from a plurality of CORESETS or a set of QCL relationships selected from a plurality of QCL relationships. The indication is for at least one COT. The apparatus includes means for determining the set of CORESETs from among the plurality of CORESETs or the set of QCL relationships from among the plurality of QCL relationships for the at least one COT based on the indication received from the base station. The apparatus further includes means for performing a reception beam sweep for the reference signal using reception beams for each of the plurality of CORESETs or for each of the plurality of QCL relationships. The reception beam sweep is performed for each of the plurality of CORESETs or for each of the plurality of QCL relationships based on at least one of a preconfigured resource in time or a repeating pattern. The repeating pattern having a reception beam for each of the plurality of CORESETs or for each of the plurality of QCL relationships. The apparatus further includes means for transmitting feedback to the base station regarding reception of the indication of the set of CORESETs selected from the plurality of CORESETs or of the set of QCL assumptions selected from the plurality of QCL assumptions. The apparatus further includes means for receiving a control channel or a RRC indicating the dedicated feedback resources for the UE prior to sending the feedback. The apparatus further includes means for holding the feedback until the scheduled uplink transmission. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
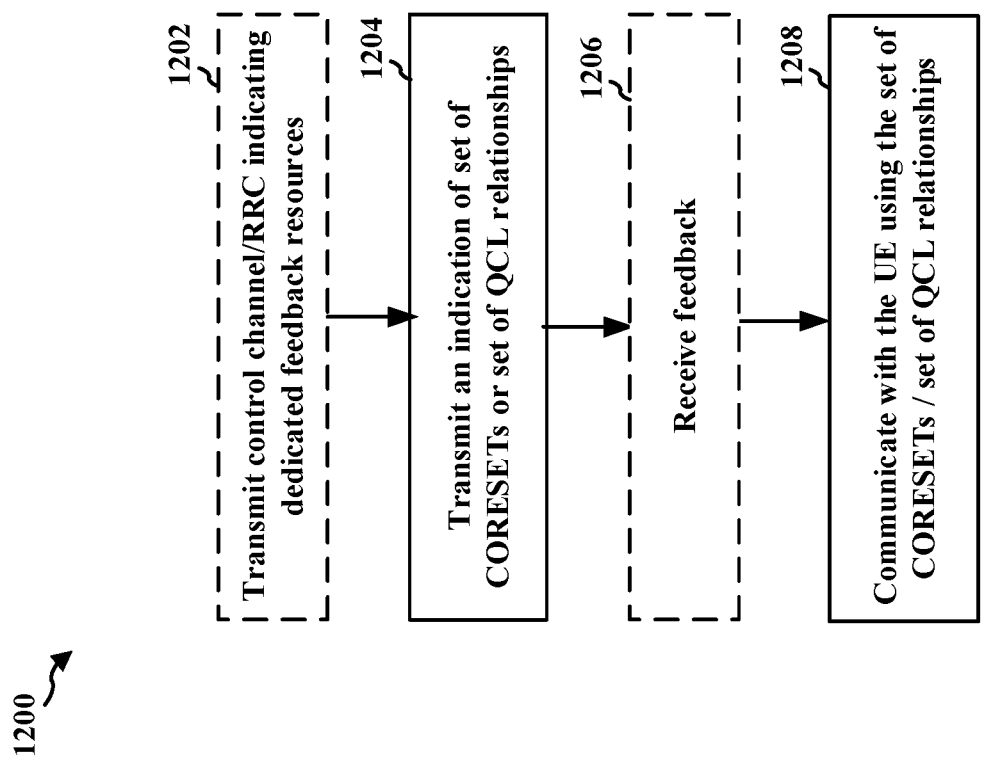
FIG. 12 is a flowchart of a method of wireless communication.

FIG. 12 is a flowchart 1200 of a method of wireless communication. The method may be performed by a base station or a component of a base station (e.g., base station 102, 180, 310, 704, 804, 1050, 1650; the apparatus 1302/1302'; the processing system 1414, which may include the memory 376 and which may be the entire base station 310 or a component of the base station 310, such as the TX processor 316, the RX processor 370, and/or the controller/processor 375). According to various aspects, one or more of the illustrated operations of the method 1200 may be omitted, transposed, and/or contemporaneously performed. The base station may implement the method of diagram 700. The method may enable a UE to more accurately determine a default beam when communicating with a base station using beamforming over an unlicensed spectrum.

At 1204, the base station transmits an indication of a set of CORESETs selected from a plurality of CORESETS or a set of QCL assumptions selected from a plurality of QCL assumptions. For example, 1204 may be performed by indication component 1308 of apparatus 1302. The base station may transmit the indication to a UE. In some aspects, the indication may be for at least one COT. In some aspects, the indication may comprise signaling identifying the set of CORESETS or the set of QCL assumptions. The indication may be comprised in a control channel transmitted in the at least one COT. In some aspects, the indication may comprise a reference signal transmitted using a same beam as a corresponding CORESET or a corresponding QCL assumption. The reference signal may be transmitted using a preconfigured resource in time for the corresponding CORESET or the corresponding QCL assumption, e.g., as described in connection with FIG. 5. The reference signal may be transmitted repeatedly using a first beam for a first CORESET from the set of CORESETs or for a first QCL assumption from the set of QCL assumptions, e.g., as described in connection with FIG. 6.

In some aspects, for example at 1206, the base station may receive feedback from the UE regarding reception of the indication of the set of CORESETs selected from the plurality of CORESETS or of the set of QCL assumptions selected from the plurality of QCL assumptions. For example 1206 may be performed by feedback component 1312 of apparatus 1302. The feedback may be received using dedicated feedback resources. For example, the base station may receive an acknowledgment if the UE successfully received the indication of the set of CORESETs selected from the plurality of CORESETs or of the set of QCL assumptions selected from the plurality of QCL assumptions. The dedicated feedback resources may comprise a physical layer sequence. The physical layer sequence may be received in an SRS or an uplink control channel.

The dedicated feedback resources are UE specific. Thus, in some aspects, the base station, at 1202, may transmit a control channel or an RRC indicating the dedicated feedback resources for the UE prior to sending the feedback. For example, 1202 may be performed by resource component 1314 of apparatus 1302.

The feedback may be received together with a scheduled uplink transmission from the UE. The scheduled uplink transmission may comprise an uplink transmission scheduled by a UE specific grant in the at least one COT. The scheduled uplink transmission may comprise feedback for a scheduled downlink transmission for the UE. The feedback may be received in a same COT as the indication. The feedback may be received in a different COT than the indication.

At 1208, the base station communicates with the UE using beams based on the set of CORESETs or the set of QCL assumptions. For example, 1208 may be performed by communication component 1310 of apparatus 1302. In some aspects, the base station may transmit a communication to the UE using beams based on the indication. The base station may receive communication from the UE using beams based on the indication.

Figure 13:
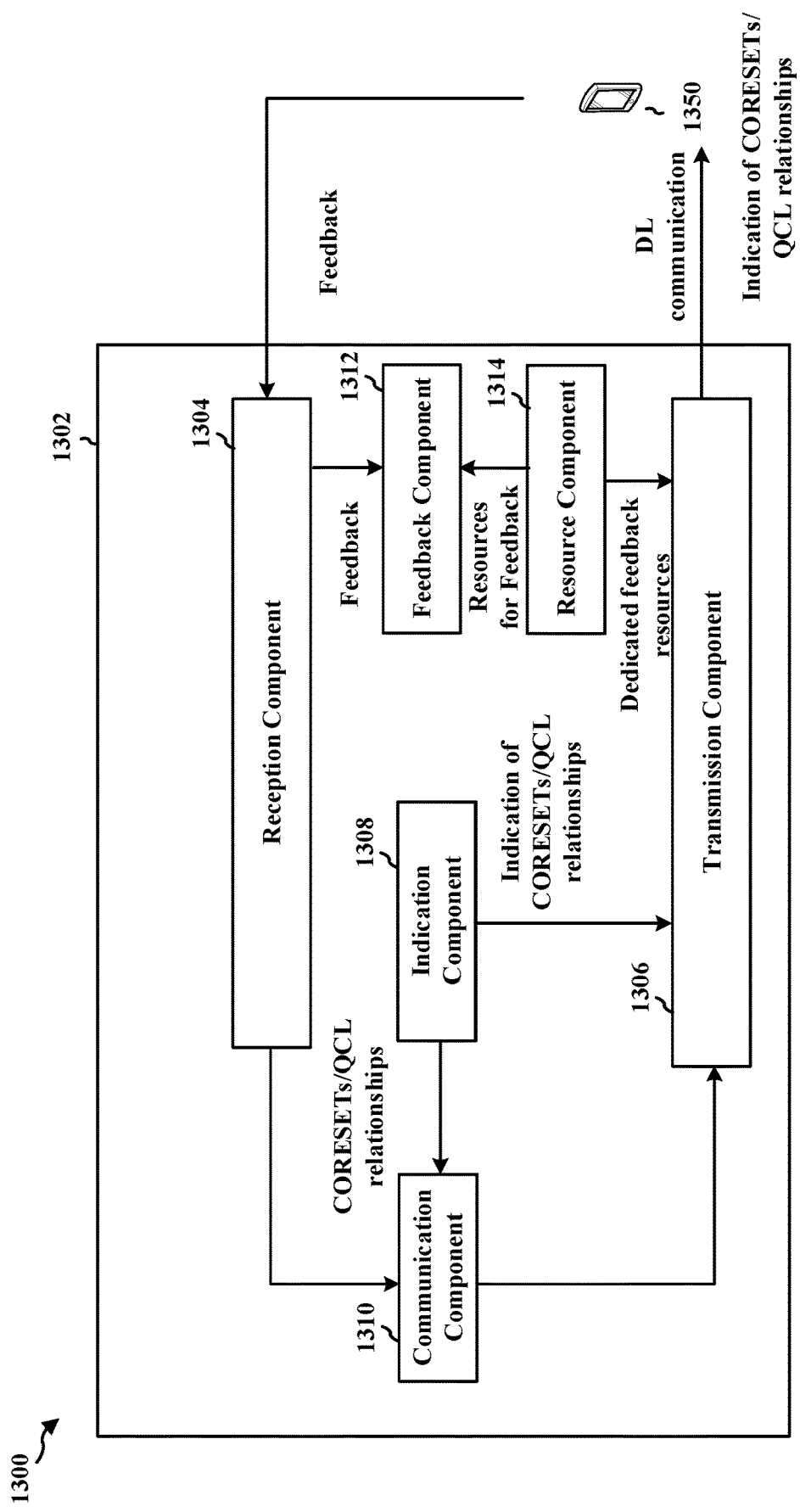
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station or a component of a base station. The apparatus may perform the method of flowchart 1200. The apparatus includes a reception component 1304 that receives uplink communication from UE 1350, and a transmission component 1306 that transmits downlink communication to UE 1350. The apparatus includes an indication component 1308 configured to transmit, to UE 1350, an indication of a set of CORESETs selected from a plurality of CORESETS or a set of QCL assumptions selected from a plurality of QCL assumptions, wherein the indication is for at least one COT, e.g., as described in connection with 1204 of FIG. 12. The apparatus includes a communication component 1310 configured to communicate with the UE using beams based on the set of CORESETs or the set of QCL assumptions, e.g., as described in connection with 1208 of FIG. 12. The apparatus includes a feedback component 1312 configured to receive feedback from the UE regarding reception of the indication of the set of CORESETs selected from the plurality of CORESETS or of the set of QCL assumptions selected from the plurality of QCL assumptions, e.g., as described in connection with 1206 of FIG. 12. The apparatus includes a resource component 1314 configured to transmit a control channel or a Radio Resource Configuration (RRC) indicating the dedicated feedback resources for the UE prior to sending the feedback, e.g., as described in connection with 1202 of FIG. 12.

The apparatus may include additional components that perform each of the blocks of the algorithm in the aforementioned flowchart of FIG. 12 As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
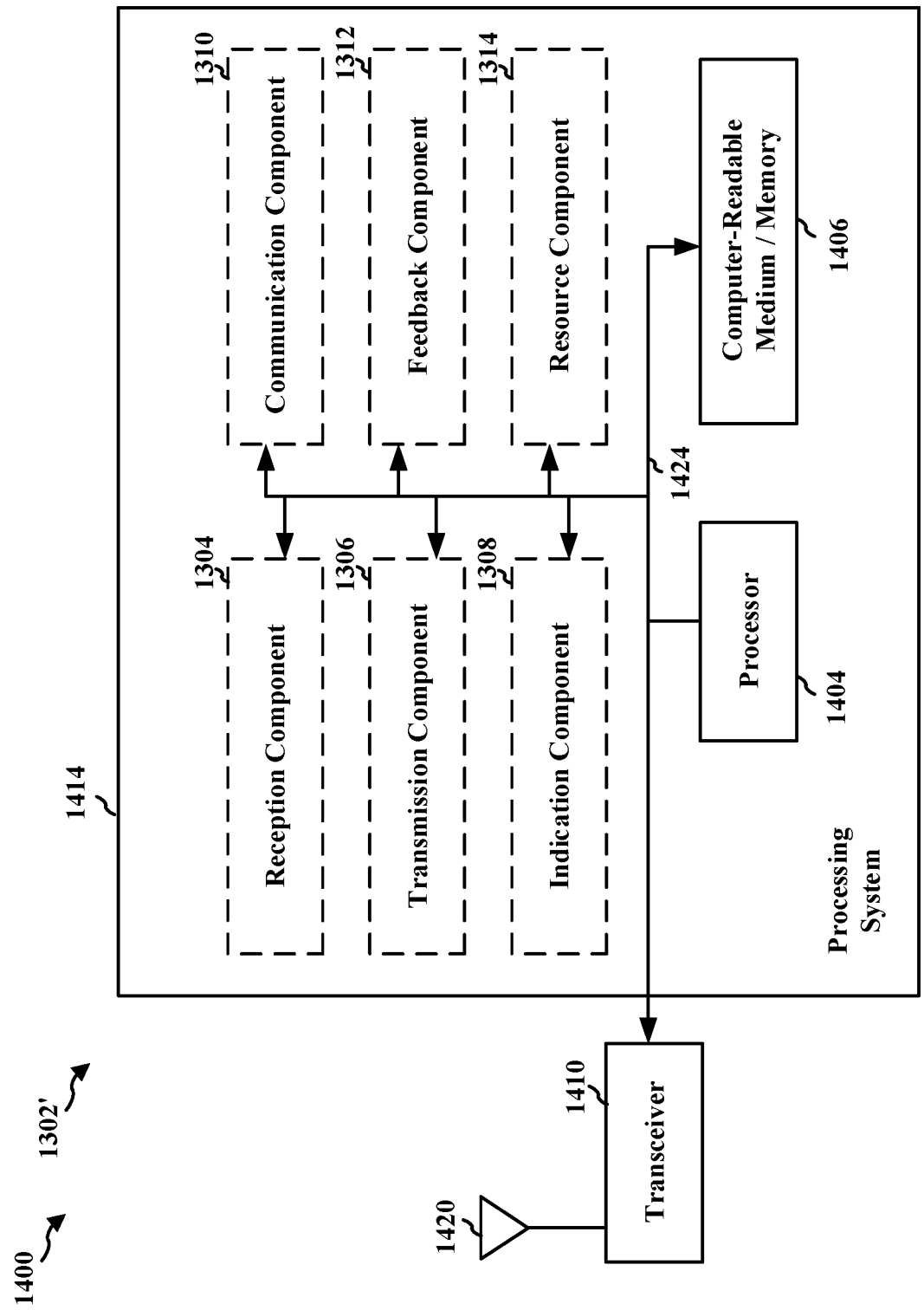
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer-readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication includes means for transmitting, to a UE, an indication of a set of CORESETs selected from a plurality of CORESETs or a set of QCL relationships selected from a plurality of QCL relationships. The indication is for at least one COT. The apparatus includes means for communicating with the UE using beams based on the set of CORESETs or the set of QCL relationships. The apparatus further includes means for receiving feedback from the UE regarding reception of the indication of the set of CORESETs selected from the plurality of CORESETs or of the set of QCL relationships selected from the plurality of QCL relationships. The apparatus further includes means for transmitting a control channel or a RRC indicating the dedicated feedback resources for the UE prior to sending the feedback. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
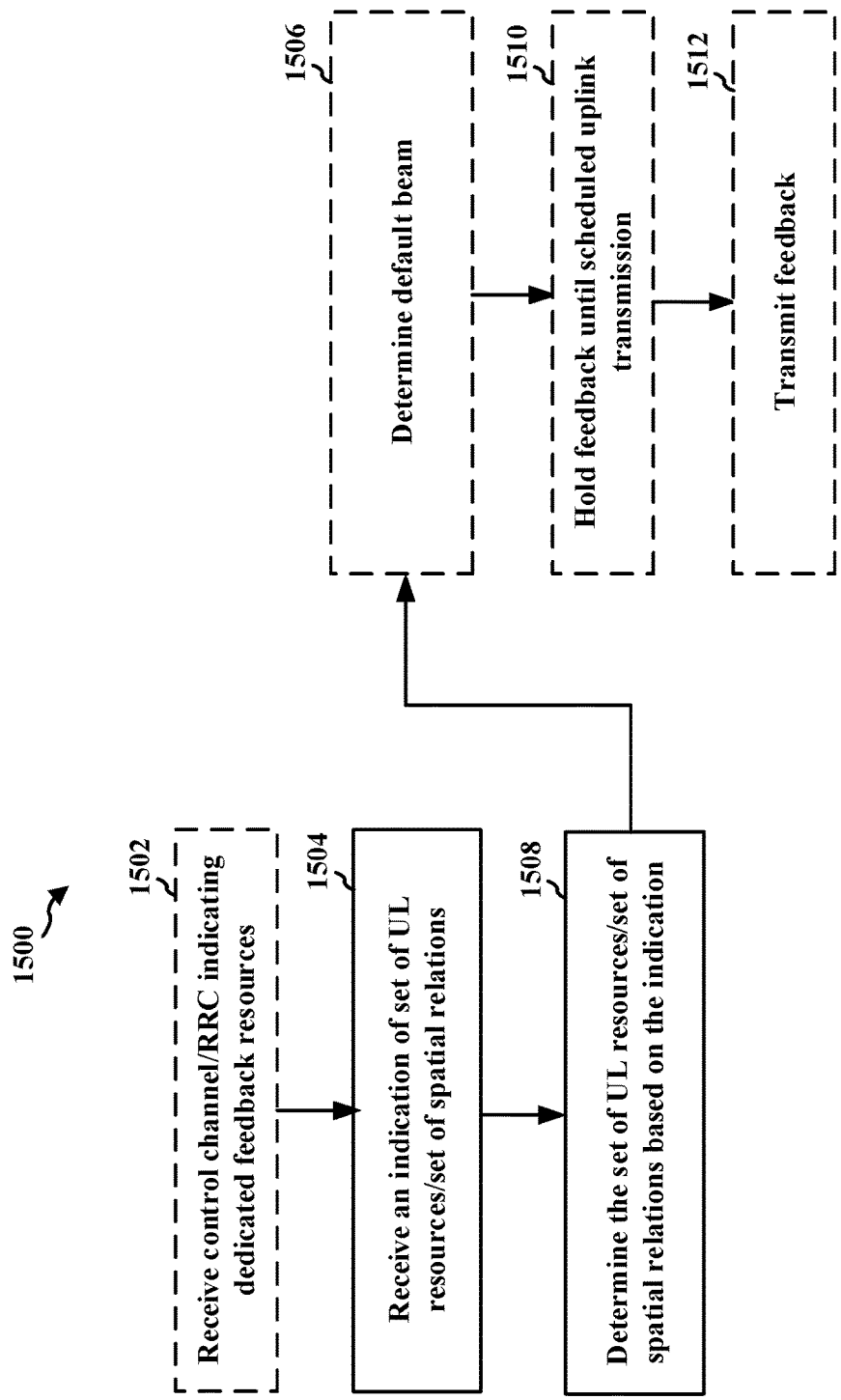
FIG. 15 is a flowchart of a method of wireless communication.

FIG. 15 is a flowchart 1500 of a method of wireless communication. The method may be performed by a UE or a component of a UE (e.g., UE 102, 350, 702, 802, 1350, 1950; the apparatus 1002/1002'; the processing system 1114, which may include the memory 360 and which may be the entire UE 350 or a component of the UE 350, such as the TX processor 368, the RX processor 356, and/or the controller/processor 359). According to various aspects, one or more of the illustrated operations of the method 1500 may be omitted, transposed, and/or contemporaneously performed. The UE may implement the method of diagram 800. The method may enable a UE to more accurately determine a default beam when communicating with a base station using beamforming over an unlicensed spectrum.

At 1504, the UE may receive an indication of a set of UL resources selected from a plurality of UL resources or a set of spatial relations selected from a plurality of spatial relations. For example, 1504 may be performed by indication component 1608 of apparatus 1602. The UE may receive the indication from a base station, in a manner similar to the aspects described in connection with FIG. 9. The indication may be for at least one COT.

At 1508, the UE may determine the set of UL resources from among the plurality of UL resources or the set of spatial relations from among the plurality of spatial relations. For example, 1508 may be performed by determination component 1610 of apparatus 1602. The UE may determine the set of UL resources or the set of spatial relations based on the indication received from the base station. The indication may include explicit signaling from the base station. In other examples, the UE may determine the information.

In some aspects, for example at 1506, the UE may determine a default beam. For example, 1506 may be performed by default beam component 1612 of apparatus 1602. The UE may determine the default beam for the at least one COT based on the set of UL resources or the set of spatial relations.

In some aspects, for example at 1512, the UE may transmit feedback to the base station regarding the determination of the set of UL resources or the set of spatial relations. For example, 1512 may be performed by feedback component 1614 of apparatus 1602. The feedback may be transmitted using dedicated feedback resources. The UE may transmit an acknowledgment if the UE successfully received the indication of the set of UL resources or the set of spatial relations for use during the at least one COT. The dedicated feedback resources may comprise a physical layer sequence transmitted in an SRS or an uplink control channel.

The dedicated feedback resources may be UE specific. Thus, in some aspects, the UE, at 1502, may receive a control channel or an RRC indicating the dedicated feedback resources for the UE prior to sending the feedback. For example, 1502 may be performed by resource component 1616 of apparatus 1602. Then, the UE may transmit the feedback at 1512 using the indicated resources.

In some aspects, for example at 1510, the UE may hold the feedback until the scheduled uplink transmission. For example, 1510 may be performed by feedback component 1614 of apparatus 1602. The feedback may be sent together with a scheduled uplink transmission from the UE. The scheduled uplink transmission may comprise an uplink transmission scheduled by a UE specific grant in the at least one COT. The scheduled uplink transmission may comprise feedback for a scheduled downlink transmission for the UE. The feedback may be transmitted in a same COT as the indication. The feedback may be transmitted in a different COT than the indication.

Figure 16:
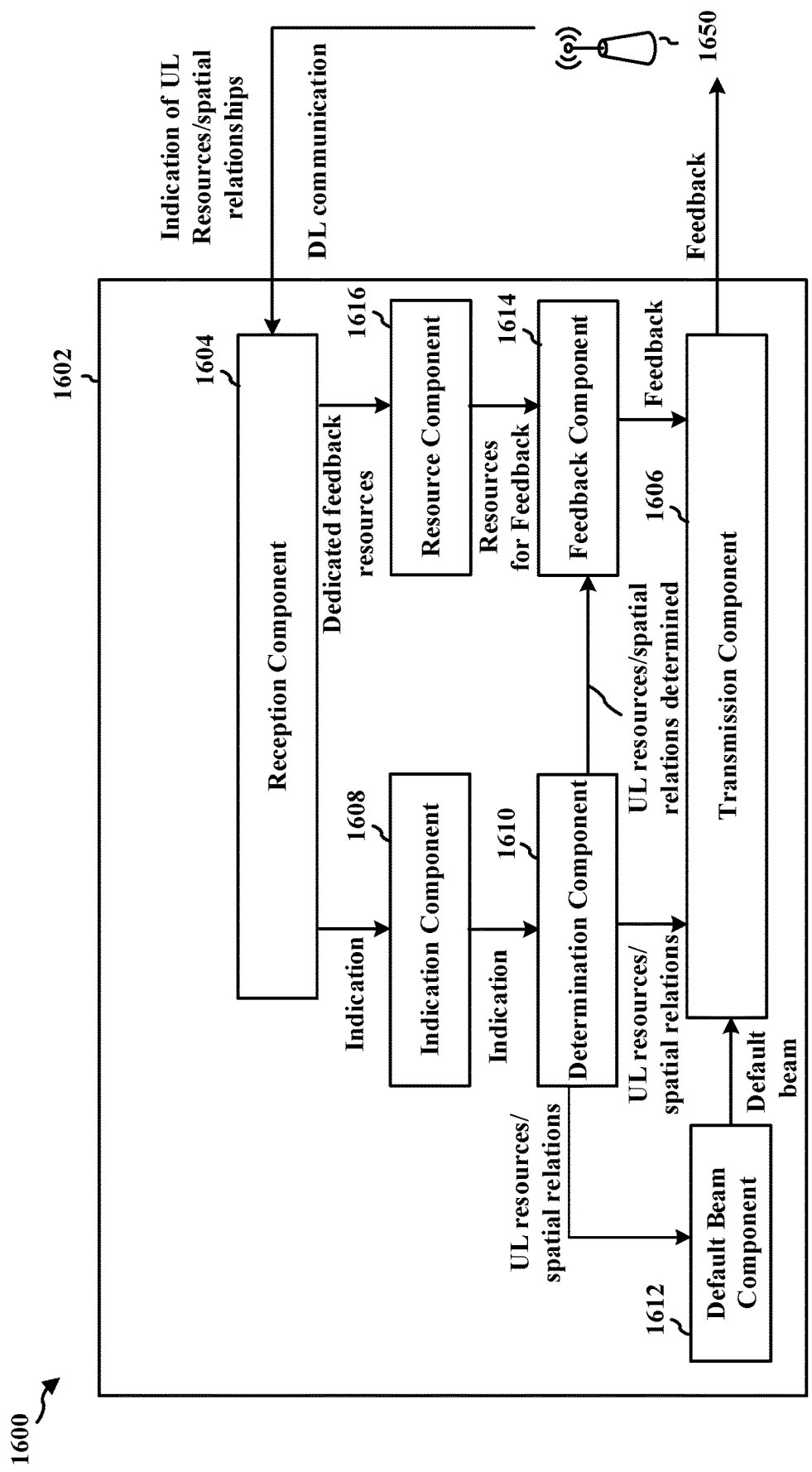
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a UE or a component of a UE. The apparatus may perform the method of flowchart 1500. The apparatus includes a reception component 1604 that receives downlink communication from base station 1650, and a transmission component 1606 that transmits a communication to base station 1650. The apparatus includes an indication component 1608 configured to receive, from a base station, an indication of a set of UL resources selected from a plurality of UL resources or a set of spatial relations selected from a plurality of spatial relations, wherein the indication is for at least one COT, e.g., as described in connection with 1504 of FIG. 15. The apparatus includes a determination component 1610 configured to determine the set of UL resources from among the plurality of UL resources or the set of spatial relations from among the plurality of spatial relations based on the indication received from the base station, e.g., as described in connection with 1508 of FIG. 15. The apparatus includes a default beam component 1612 configured to determine a default beam for the at least one COT based on the set of UL resources or the set of spatial relations, e.g., as described in connection with 1506 of FIG. 15. The apparatus includes a feedback component 1614 configured to transmit feedback to the base station regarding the determination of the set of UL resources or the set of spatial relations, e.g., as described in connection with 1512 of FIG. 15. The feedback component 1614 may be configured to hold the feedback until the scheduled uplink transmission, e.g., as described in connection with 1510 of FIG. 15. The apparatus includes a resource component 1616 configured to receive a control channel or an RRC indicating the dedicated feedback resources for the UE prior to sending the feedback, e.g., as described in connection with 1502 of FIG. 15.

The apparatus may include additional components that perform each of the blocks of the algorithm in the aforementioned flowchart of FIG. 15. As such, each block in the aforementioned flowchart of FIG. 15 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
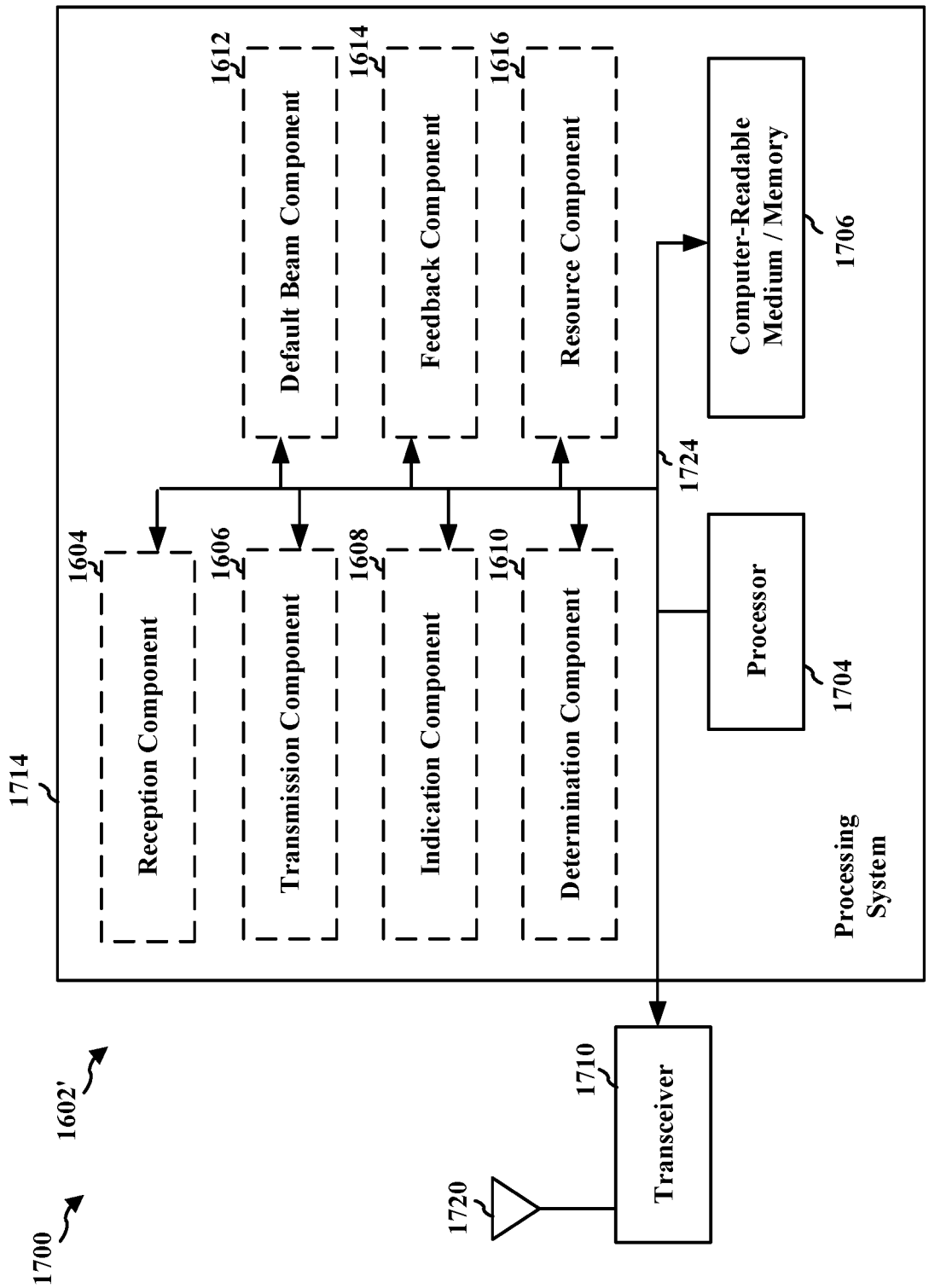
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616. The components may be software components running in the processor 1704, resident/stored in the computer-readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for receiving, from a base station, an indication of a set of UL resources selected from a plurality of UL resources or a set of spatial relations selected from a plurality of spatial relations. The indication is for at least one COT. The apparatus includes means for determining the set of UL resources from among the plurality of UL resources or the set of spatial relations from among the plurality of spatial relations based on the indication received from the base station. The apparatus further includes means for determining a default beam for the at least one COT based on the set of UL resources or the set of spatial relations. The apparatus further includes means for sending feedback to the base station regarding the determination of the set of UL resources or the set of spatial relations. The apparatus further includes means for receiving a control channel or an RRC indicating the dedicated feedback resources for the UE prior to sending the feedback. The apparatus further includes means for holding the feedback until the scheduled uplink transmission. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
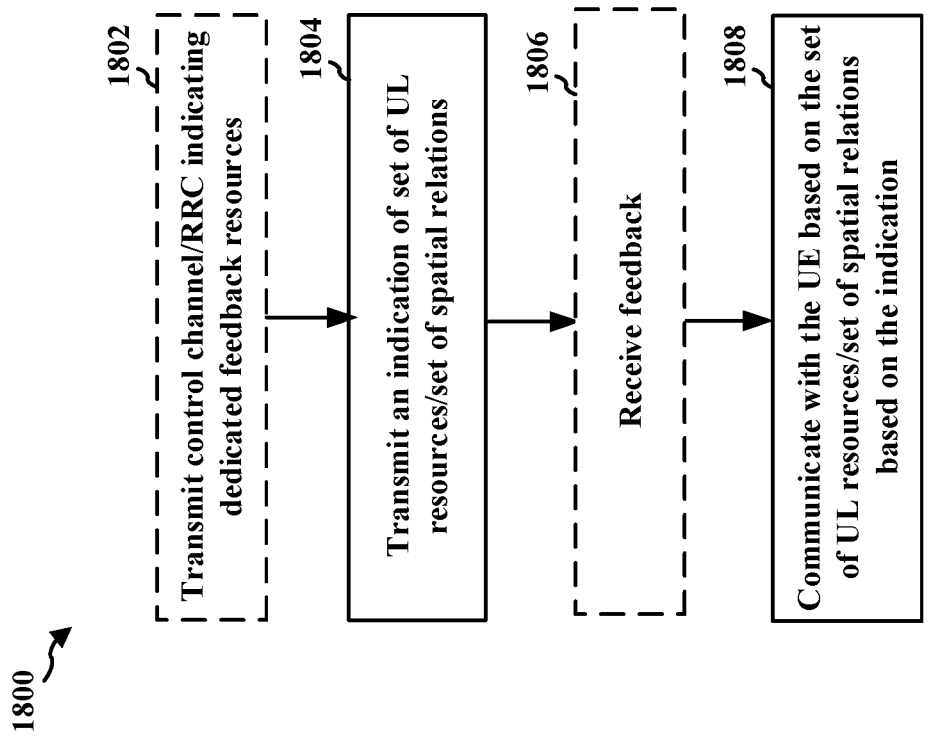
FIG. 18 is a flowchart of a method of wireless communication.

FIG. 18 is a flowchart 1800 of a method of wireless communication. The method may be performed by a base station or a component of a base station (e.g., base station 102, 180, 310, 704, 804, 1050, 1650; the apparatus 1902/1902'; the processing system 2014, which may include the memory 376 and which may be the entire base station 310 or a component of the base station 310, such as the TX processor 316, the RX processor 370, and/or the controller/processor 375). According to various aspects, one or more of the illustrated operations of the method 1800 may be omitted, transposed, and/or contemporaneously performed. The base station may implement the method of diagram 800. The method may enable a UE to more accurately determine a default beam when communicating with a base station using beamforming over an unlicensed spectrum.

In some aspects, for example at 1802, the base station may transmit control channel and/or RRC indicating dedicated feedback resources. For example, 1802 may be performed by resource component 1914 of apparatus 1902. The base station transmits the control channel or RRC to a UE. In some aspects, the dedicated feedback resources may be UE specific. The UE may transmit the feedback as illustrated at 1512 of FIG. 15 using the indicated resources.

At 1804, the base station may transmit an indication of a set of UL resources selected from a plurality of UL resources or a set of spatial relations selected from a plurality of spatial relations. For example, 1804 may be performed by indication component 1908 of apparatus 1902. In some aspects, the indication may be for at least one COT.

In some aspects, for example at 1806, the base station may receive feedback. For example, 1806 may be performed by feedback component 1912 of apparatus 1902. The base station may receive feedback from the UE regarding a determination of the set of UL resources or the set of spatial relations. The feedback may be received using dedicated feedback resources. In an example, the dedicated feedback resources may include a physical layer sequence transmitted in an SRS or an uplink control channel. In another example, the dedicated feedback resources may be UE specific. The feedback may be received together with a scheduled uplink transmission from the UE. In an example, the scheduled uplink transmission may include an uplink transmission scheduled by a UE specific grant in the at least one COT. In another example, the scheduled uplink transmission may include feedback for a scheduled downlink transmission for the UE. In an aspect, the feedback may be received in a same COT as the indication. In another aspect, the feedback may be received in a different COT than the indication.

At 1808, the base station communicates with the UE based on the set of UL resources and/or the set of spatial relations based on the indication. For example, 1808 may be performed by communication component 1910 of apparatus 1902. The base station may transmit communications to the UE using the set of UL resources or the set of spatial relations indicated to the UE.

Figure 19:
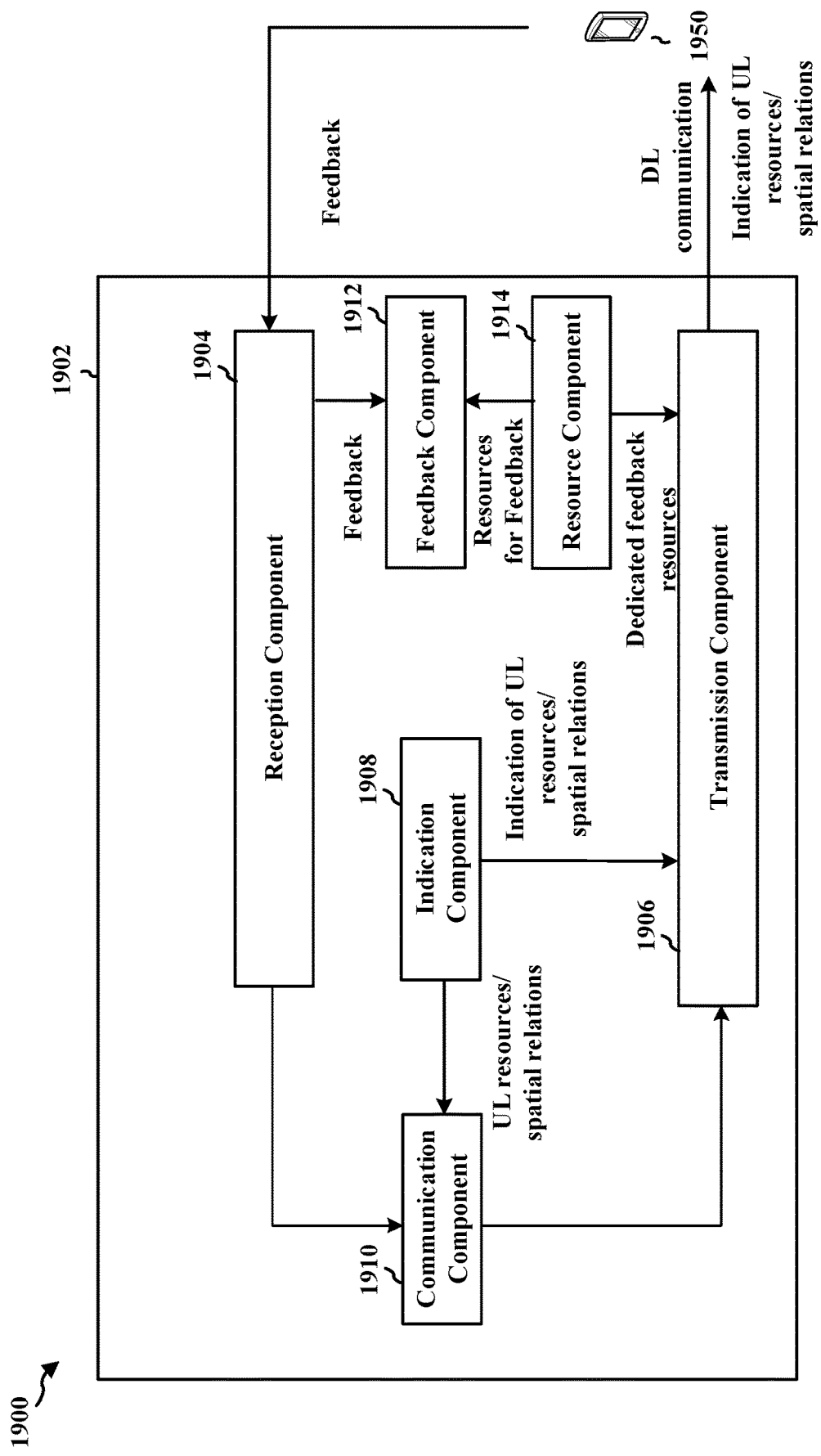
FIG. 19 is a conceptual data flow diagram illustrating the data flow between different means/components in an example apparatus.

FIG. 19 is a conceptual data flow diagram 1900 illustrating the data flow between different means/components in an example apparatus 1902. The apparatus may be a base station or a component of a base station. The apparatus may perform the method of flowchart 1800. The apparatus includes a reception component 1904 that receives uplink communication (e.g., feedback) from a UE 1950, and a transmission component 1906 that transmits downlink communication to the UE 1950. The apparatus includes indication component 1908 that may provide an indication of a set of UL resources selected from a plurality of UL resources or a set of spatial relations selected from a plurality of spatial relations, e.g., as described in connection with 1804 of FIG. 18. The apparatus includes a communication component 1910 that may configure the transmission component 1906 to communicate with the UE 1950 based on the set of UL resources and/or set of spatial relations based on the indication, e.g., as described in connection with 1808 of FIG. 18. The apparatus includes a feedback component 1912 that receives feedback from the UE 1950 regarding a determination of the set of UL resources or the set of spatial relations, e.g., as described in connection with 1806 of FIG. 18. The apparatus includes a resource component 1914 that may transmit control channel and/or RRC indicating dedicated feedback resources, e.g., as described in connection with 1802 of FIG. 18.

The apparatus may include additional components that perform each of the blocks of the algorithm in the aforementioned flowchart of FIG. 18. As such, each block in the aforementioned flowchart of FIG. 18 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
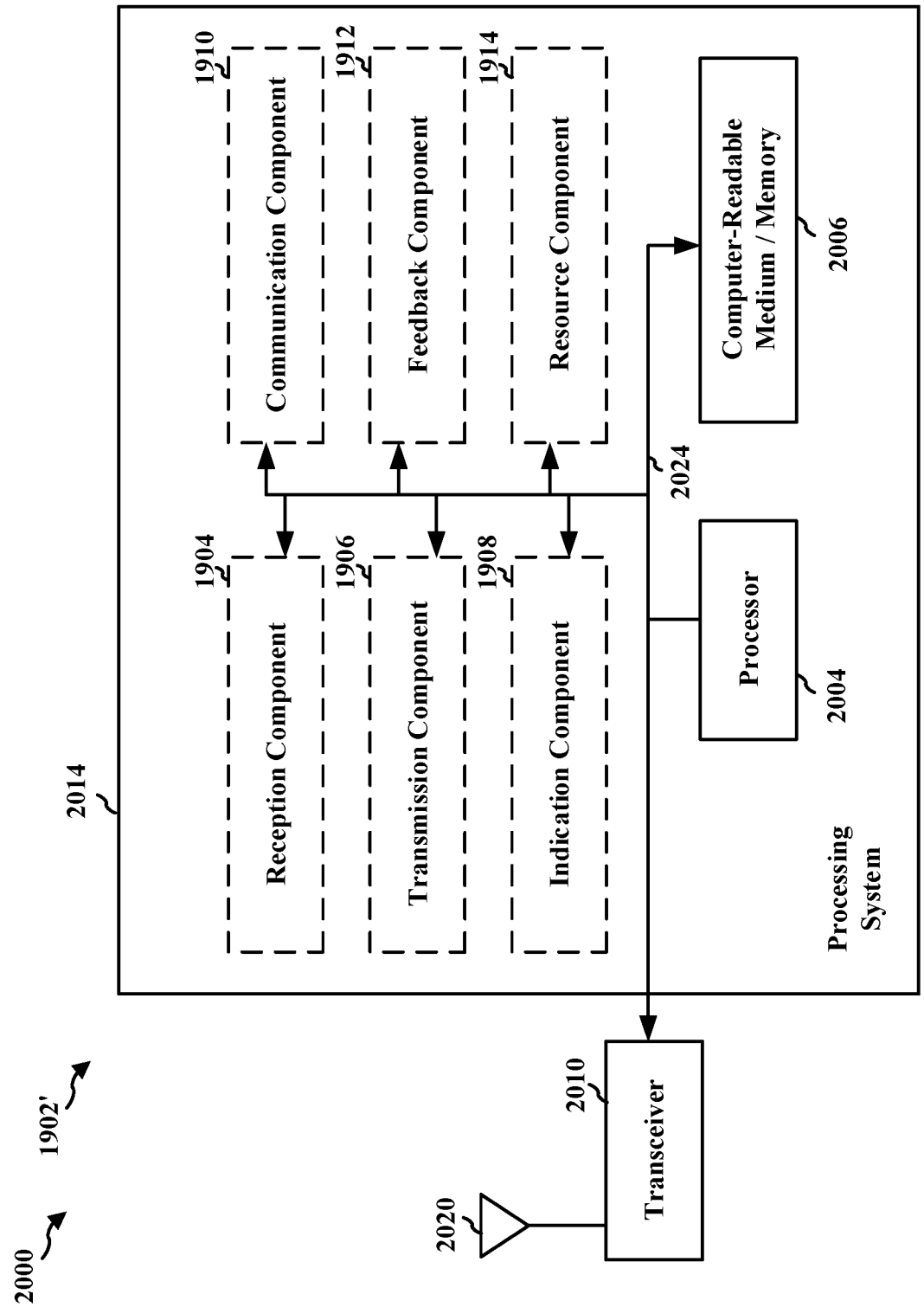
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, 1914, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1906, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912, 1914. The components may be software components running in the processor 2004, resident/stored in the computer-readable medium/memory 2006, one or more hardware components coupled to the processor 2004, or some combination thereof. The processing system 2014 may be a component of the base station 310 and may include the memory 376 and/or at least one of the TX processor 316, the RX processor 370, and the controller/processor 375.

In one configuration, the apparatus 1902/1902' for wireless communication includes means for transmitting, to a UE, an indication of a set of UL resources selected from a plurality of UL resources or a set of spatial relations selected from a plurality of spatial relations. The indication is for at least one COT. The apparatus includes means for transmitting communication to the UE using the set of UL resources or the set of spatial relations indicated to the UE. The apparatus further includes means for receiving feedback from the UE regarding a determination of the set of UL resources or the set of spatial relations. The apparatus further includes means for transmitting a control channel or a RRC indicating the dedicated feedback resources for the UE prior to sending the feedback. The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure relates to communication enhancements between the base station and the UE through the base station indicating to the UE which CORESET(s) or QCL assumptions are selected for a COT. The UE may use the indication to determine a set of CORESET or a set of QCL relationships for communication with the base station. In addition, the base station may indicate selected uplink (UL) resources or spatial relationships for the COT that the UE may use to determine a default beam. At least one advantage of the disclosure is that the UE may be configured to more accurately determine a default beam or a beam that corresponds to a CORESET when communicating with a base station using beamforming over an unlicensed spectrum.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE) comprising:
   receiving, from a base station, an indication of a set of Control Resource Sets (CORESETs) selected from a plurality of CORESETS or a set of Quasi co-location (QCL) relationships selected from a plurality of QCL relationships, wherein the indication is for at least one Channel Occupancy Time (COT); and
   determining the set of CORESETS from among the plurality of CORESETs or the set of QCL relationships from among the plurality of QCL relationships for the at least one COT based on the indication received from the base station.

2. The method of claim 1, wherein the indication comprises signaling identifying the set of CORESETS, and wherein the indication is comprised in a control channel received in the at least one COT.

3. The method of claim 1, wherein the UE determines each CORESET in the set of CORESETs or each QCL relationship in the set of QCL relationships based on detecting a reference signal using a same beam as a corresponding CORESET.

4. The method of claim 3, further comprising:
   performing a receive beam sweep for the reference signal using reception beams for each of the plurality of CORESETs or for each of the plurality of QCL relationships, wherein the reception beam sweep is performed for each of the plurality of CORESETs or for each of the plurality of QCL relationships based on at least one of a preconfigured time resource; or
   a repeating pattern, the repeating pattern having a reception beam for each of the plurality of CORESETs or for each of the plurality of QCL relationships.

5. The method of claim 4, wherein the UE determines a CORESET from the plurality of CORESETs to be in the set of CORESETs if a measurement of the reference signal, measured using the same beam as the CORESET, meets a threshold, or
   wherein a QCL relationship from the plurality of QCL relationships is in the set of QCL relationships if the measurement of the reference signal, measured using the same beam as the QCL relationship, meets the threshold.

6. The method of claim 4, wherein a CORESET from the plurality of CORESETs is in the set of CORESETs if a measurement of the reference signal, measured using the same beam as the CORESET, is highest among the reception beams for the plurality of CORESETs, or
   wherein a QCL relationship from the plurality of QCL relationships is in the set of QCL relationships if the measurement of the reference signal, measured using the same beam as the QCL relationship, is highest among the reception beams for the plurality of QCL relationships.

7. The method of claim 1, further comprising:
   transmitting feedback to the base station acknowledging whether the indication was received of the set of CORESETs selected from the plurality of CORESETS or of the set of QCL relationships selected from the plurality of QCL relationships.

8. The method of claim 7, wherein the feedback is transmitted using dedicated feedback resources.

9. The method of claim 8, wherein the UE transmits an acknowledgment if the UE successfully received the indication of the set of CORESETs selected from the plurality of CORESETs or of the set of QCL relationships selected from the plurality of QCL relationships.

10. The method of claim 8, wherein the dedicated feedback resources comprise a physical layer sequence.

11. The method of claim 8, wherein the dedicated feedback resources are UE specific, the method further comprising:
    receiving a control channel or a Radio Resource Configuration (RRC) indicating the dedicated feedback resources for the UE prior to sending the feedback.

12. The method of claim 7, wherein the feedback is sent together with a scheduled uplink transmission from the UE, the method further comprising:
 holding the feedback until the scheduled uplink transmission.

13. A method of wireless communication at a base station, comprising:
 transmitting, to a User Equipment (UE), an indication of a set of Control Resource Sets (CORESETs) selected from a plurality of CORESETS or a set of Quasi co-location (QCL) relationships selected from a plurality of QCL relationships, wherein the indication is for at least one Channel Occupancy Time (COT); and
 communicating with the UE using beams based on the set of CORESETs or the set of QCL relationships.

14. The method of claim 13, wherein the indication comprises signaling identifying the set of CORESETS or the set of QCL relationships, wherein the indication is comprised in a control channel received in the at least one COT.

15. The method of claim 13, wherein the indication comprises a reference signal transmitted using a same beam as a corresponding CORESET or a corresponding QCL relationship, wherein the reference signal is transmitted using at least one of:
 a preconfigured time resource for the corresponding CORESET or the corresponding QCL relationship; and
 repetitions with a first beam for a first CORESET from the set of CORESETs or for a first QCL relationship from the set of QCL relationships.

16. The method of claim 13, further comprising:
 receiving feedback from the UE regarding reception of the indication of the set of CORESETs selected from the plurality of CORESETS or of the set of QCL relationships selected from the plurality of QCL relationships.

17. The method of claim 16, wherein the feedback is received using dedicated feedback resources, and wherein the base station receives an acknowledgment if the UE successfully received the indication of the set of CORESETs selected from the plurality of CORESETs or of the set of QCL relationships selected from the plurality of QCL relationships.

18. The method of claim 17, wherein the dedicated feedback resources are UE specific, the method further comprising:
 transmitting a control channel or a Radio Resource Configuration (RRC) indicating the dedicated feedback resources for the UE prior to sending the feedback.

19. The method of claim 16, wherein the feedback is received with a scheduled uplink transmission from the UE.

20. The method of claim 19, wherein the scheduled uplink transmission comprises an uplink transmission scheduled by a UE specific grant in the at least one COT, or feedback for a scheduled downlink transmission for the UE.

21. A method of wireless communication at a User Equipment (UE) comprising:
 receiving, from a base station, an indication of a set of uplink (UL) resources selected from a plurality of UL resources or a set of spatial relations selected from a plurality of spatial relations, wherein the indication is for at least one Channel Occupancy Time (COT); and
 determining the set of UL resources from among the plurality of UL resources or the set of spatial relations from among the plurality of spatial relations based on the indication received from the base station.

22. The method of claim 21, further comprising:
 determining a default beam for the at least one COT based on the set of UL resources or the set of spatial relations.

23. The method of claim 21, further comprising:
 sending feedback to the base station regarding the determination of the set of UL resources or the set of spatial relations.

24. The method of claim 23, wherein the feedback is transmitted using dedicated feedback resources, wherein the UE transmits an acknowledgment if the UE successfully received the indication of the set of UL resources or the set of spatial relations for use during the at least one COT.

25. The method of claim 23, wherein the feedback is sent together with a scheduled uplink transmission from the UE, the method further comprising:
 holding the feedback until the scheduled uplink transmission.

26. A method of wireless communication at a base station, comprising:
 transmitting, to a User Equipment (UE), an indication of a set of uplink (UL) resources selected from a plurality of UL resources or a set of spatial relations selected from a plurality of spatial relations, wherein the indication is for at least one Channel Occupancy Time (COT); and
 transmitting communication to the UE using the set of UL resources or the set of spatial relations indicated to the UE.

27. The method of claim 26, further comprising:
 receiving feedback from the UE regarding a determination of the set of UL resources or the set of spatial relations.

28. The method of claim 27, wherein the feedback is received using dedicated feedback resources, wherein the dedicated feedback resources comprise a physical layer sequence transmitted in a Sounding Reference Signal (SRS) or an uplink control channel, or UE specific resources.

29. The method of claim 28, wherein the dedicated feedback resources are UE specific, the method further comprising:
 transmitting a control channel or a Radio Resource Configuration (RRC) indicating the dedicated feedback resources for the UE prior to sending the feedback.

30. The method of claim 27, wherein the feedback is received together with a scheduled uplink transmission from the UE, and wherein the scheduled uplink transmission comprises an uplink transmission scheduled by a UE specific grant in the at least one COT or feedback for a scheduled downlink transmission for the UE.

* * * * *